United States Patent
Kamada

(10) Patent No.: US 7,640,039 B2
(45) Date of Patent: Dec. 29, 2009

(54) WIRELESS COMMUNICATION TERMINAL SYNCHRONIZATION METHOD, WIRELESS COMMUNICATION SYSTEM, WIRELESS COMMUNICATION TERMINAL, AND SERVER

(75) Inventor: Tomihisa Kamada, Tokyo (JP)

(73) Assignee: Access Company, Ltd., Tokyo (JP)

( * ) Notice: Subject to any disclaimer, the term of this patent is extended or adjusted under 35 U.S.C. 154(b) by 54 days.

(21) Appl. No.: 10/591,406

(22) PCT Filed: Feb. 24, 2005

(86) PCT No.: PCT/JP2005/003011

§ 371 (c)(1),
(2), (4) Date: Sep. 1, 2006

(87) PCT Pub. No.: WO2005/086519

PCT Pub. Date: Sep. 15, 2005

(65) Prior Publication Data

US 2007/0191057 A1      Aug. 16, 2007

(30) Foreign Application Priority Data

Mar. 4, 2004   (JP) .............................. 2004-060257

(51) Int. Cl.
*H04B 1/38*      (2006.01)
(52) U.S. Cl. ................. 455/558; 455/550.1; 455/412.1; 455/502
(58) Field of Classification Search ........... 455/558, 455/550.1, 412.11
See application file for complete search history.

(56) References Cited

U.S. PATENT DOCUMENTS 6,889,059 B1 * 5/2005 Fragola ....................... 455/558

(Continued)

FOREIGN PATENT DOCUMENTS

EP      0607767 A1      7/1994

(Continued)

OTHER PUBLICATIONS

International Search Report mailed May 10, 2005, for international application No. PCT/JP2005/003011, filed Feb. 24, 2005, 2 pages.

(Continued)

*Primary Examiner*—Matthew D Anderson
*Assistant Examiner*—Amar Daglawi
(74) *Attorney, Agent, or Firm*—Morrison & Foerster LLP

(57) ABSTRACT

In the case where a single user selectively uses plural wireless communication terminals by mounting and demounting a subscriber identification card thereon and therefrom, user convenience in such selective use of the plural terminals can be enhanced by synchronizing user data among those plural terminals. For this purpose, at least updated portion of the data stored in the memory in terminal is uploaded from the first terminal $10a$ on which SIM card (subscriber information card) 12 is mounted, to a server 50 via a communication network 20, according to a user's request or automatically. After the SIM card 12 demounted from the first terminal is mounted on the second terminal $10b$ or $10c$, data to be downloaded to the second terminal from the server 50 is determined according to the user's request or automatically, and the data is downloaded to the second terminal from the server 50. In the second terminal, thus downloaded data is used to update the contents in the memory.

28 Claims, 24 Drawing Sheets

U.S. PATENT DOCUMENTS

| | | | |
|---|---|---|---|
| 7,146,191 B2 * | 12/2006 | Kerner et al. | 455/558 |
| 7,190,969 B1 * | 3/2007 | Oh et al. | 455/551 |
| 7,369,851 B2 * | 5/2008 | Okonnen et al. | 455/435.1 |
| 2001/0034247 A1 * | 10/2001 | Namiki | 455/558 |
| 2003/0125083 A1 * | 7/2003 | Iwasaki | 455/558 |
| 2003/0224819 A1 * | 12/2003 | Sanchez | 455/552.1 |
| 2004/0166839 A1 * | 8/2004 | Okkonen et al. | 455/419 |
| 2004/0180657 A1 * | 9/2004 | Yaqub et al. | 455/435.1 |
| 2004/0203900 A1 * | 10/2004 | Cedervall et al. | 455/456.1 |
| 2004/0253947 A1 * | 12/2004 | Phillips et al. | 455/422.1 |
| 2005/0003850 A1 * | 1/2005 | Tsuda et al. | 455/550.1 |
| 2005/0048997 A1 * | 3/2005 | Grobler et al. | 455/550.1 |
| 2005/0064862 A1 * | 3/2005 | Castrogiovanni et al. | 455/420 |
| 2005/0107134 A1 * | 5/2005 | Morioka et al. | 455/574 |
| 2005/0125344 A1 * | 6/2005 | Utsumi | 705/39 |
| 2005/0136979 A1 * | 6/2005 | Dietl et al. | 455/558 |
| 2006/0105765 A1 * | 5/2006 | Matsui et al. | 455/428 |
| 2007/0050365 A1 * | 3/2007 | Laitinen et al. | 707/9 |
| 2007/0077966 A1 * | 4/2007 | Huang | 455/558 |
| 2007/0082704 A1 * | 4/2007 | Nakano et al. | 455/558 |
| 2007/0108073 A1 * | 5/2007 | Redmond | 206/268 |
| 2007/0184823 A1 * | 8/2007 | Okkonen et al. | 455/419 |

FOREIGN PATENT DOCUMENTS

| | | |
|---|---|---|
| EP | 0950968 A1 | 10/1999 |
| EP | 0950968 A1 * | 10/1999 |
| EP | 950968 A1 * | 10/1999 |
| JP | 06-216842 | 8/1994 |
| JP | 11-167551 | 6/1999 |
| JP | 2000-022839 | 1/2000 |
| JP | 2000-174894 | 6/2000 |
| JP | 2000-510303 | 8/2000 |
| JP | 2001-309433 | 11/2001 |
| JP | 2002-57807 | 2/2002 |
| JP | 2003-319460 | 11/2003 |
| WO | WO-97/43866 | 11/1997 |
| WO | WO-99/09502 | 2/1999 |

OTHER PUBLICATIONS

Written Opinion mailed May 10, 2005, for international application No. PCT/JP2005/003011, filed Feb. 24, 2005, 4 pages.

* cited by examiner

FIG. 7(a)

SUBSCRIBER MANAGING DB 30

| SUBSCRIBER ID | TERMINAL ID | TERMINAL PASSWORD |
|---|---|---|
| SUBSCRIBER IDa | TERMINAL IDa1<br>TERMINAL IDa2<br>TERMINAL IDa3 | PASSWORDa1<br>PASSWORDa2<br>PASSWORDa3 |
| SUBSCRIBER IDb | TERMINAL IDb1<br>TERMINAL IDb2 | PASSWORDb1<br>PASSWORDb2 |
| ⋮ | ⋮ | ⋮ |

FIG. 7(b)

SUBSCRIBER MANAGING DB 30'

| SUBSCRIBER ID | TERMINAL ID | TERMINAL PASSWORD | SYNCHRONIZATION TARGET DATA |
|---|---|---|---|
| SUBSCRIBER IDa | TERMINAL IDa1<br>TERMINAL IDa2<br>TERMINAL IDa3 | PASSWORDa1<br>PASSWORDa2<br>PASSWORDa3 | D1-D8<br>D1-D6, D8<br>D1-D3, D6, D7 |
| SUBSCRIBER IDb | TERMINAL IDb1<br>TERMINAL IDb2 | PASSWORDb1<br>PASSWORDb2 | D1-D8<br>D1-D3, D6 |
| ⋮ | ⋮ | ⋮ | ⋮ |

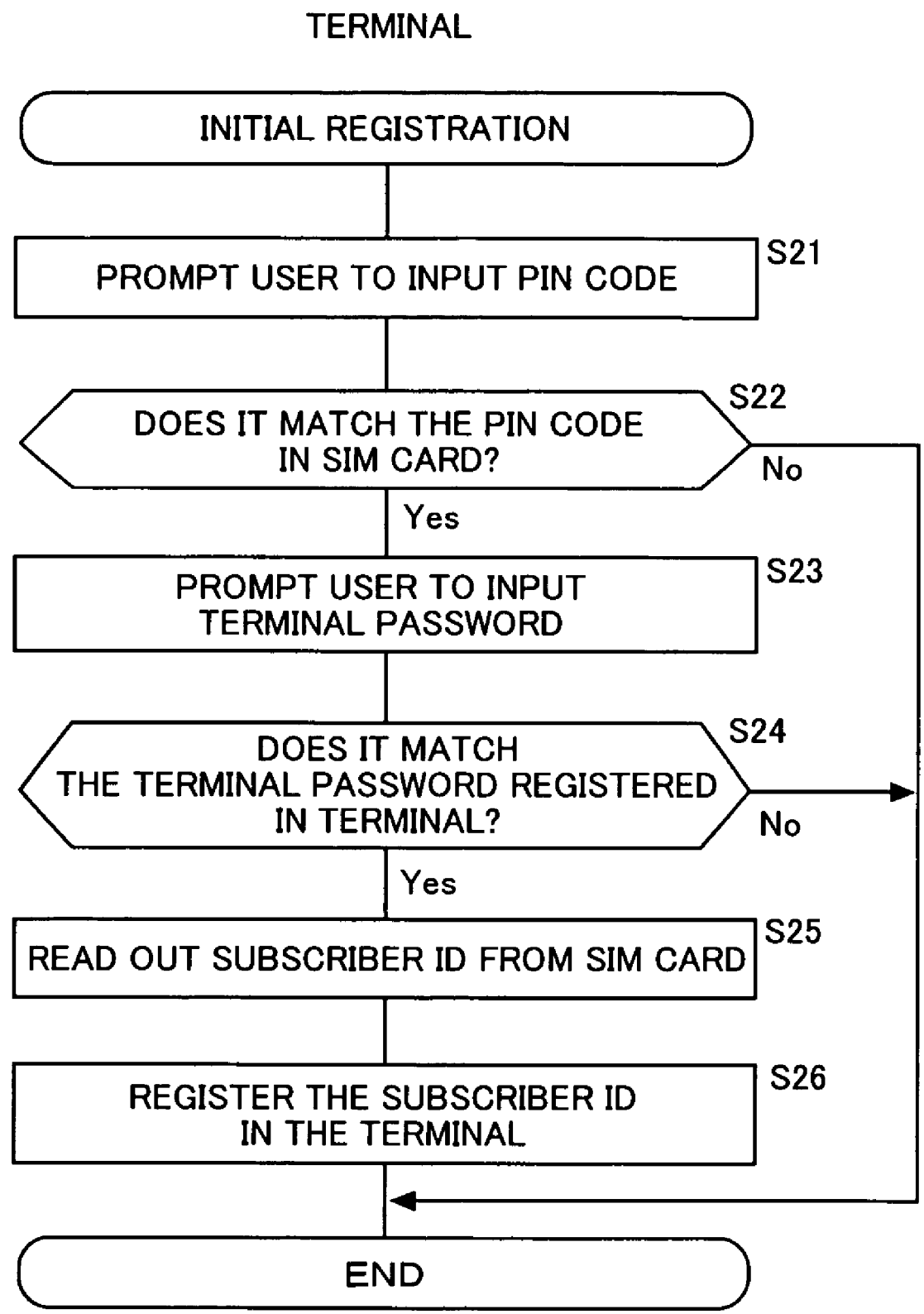
FIG. 10-A

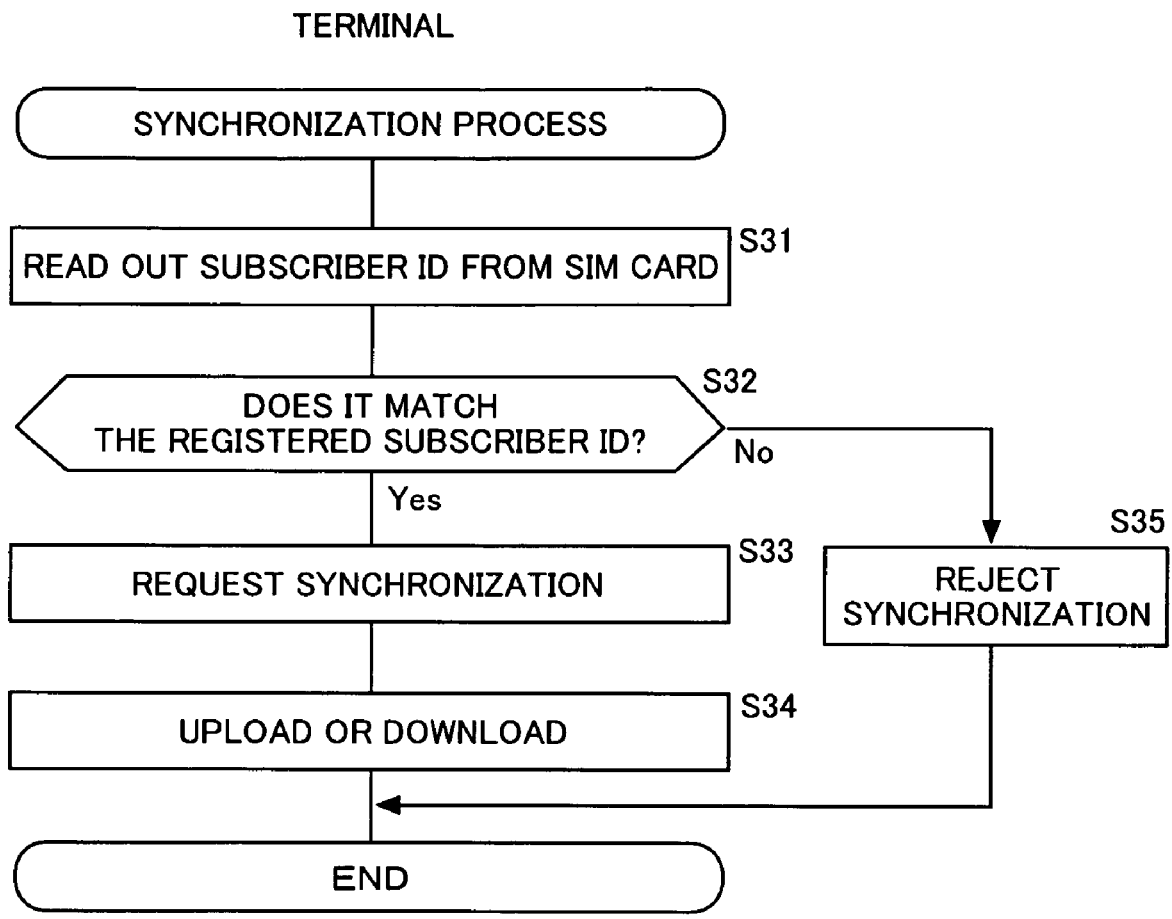
FIG. 10-B

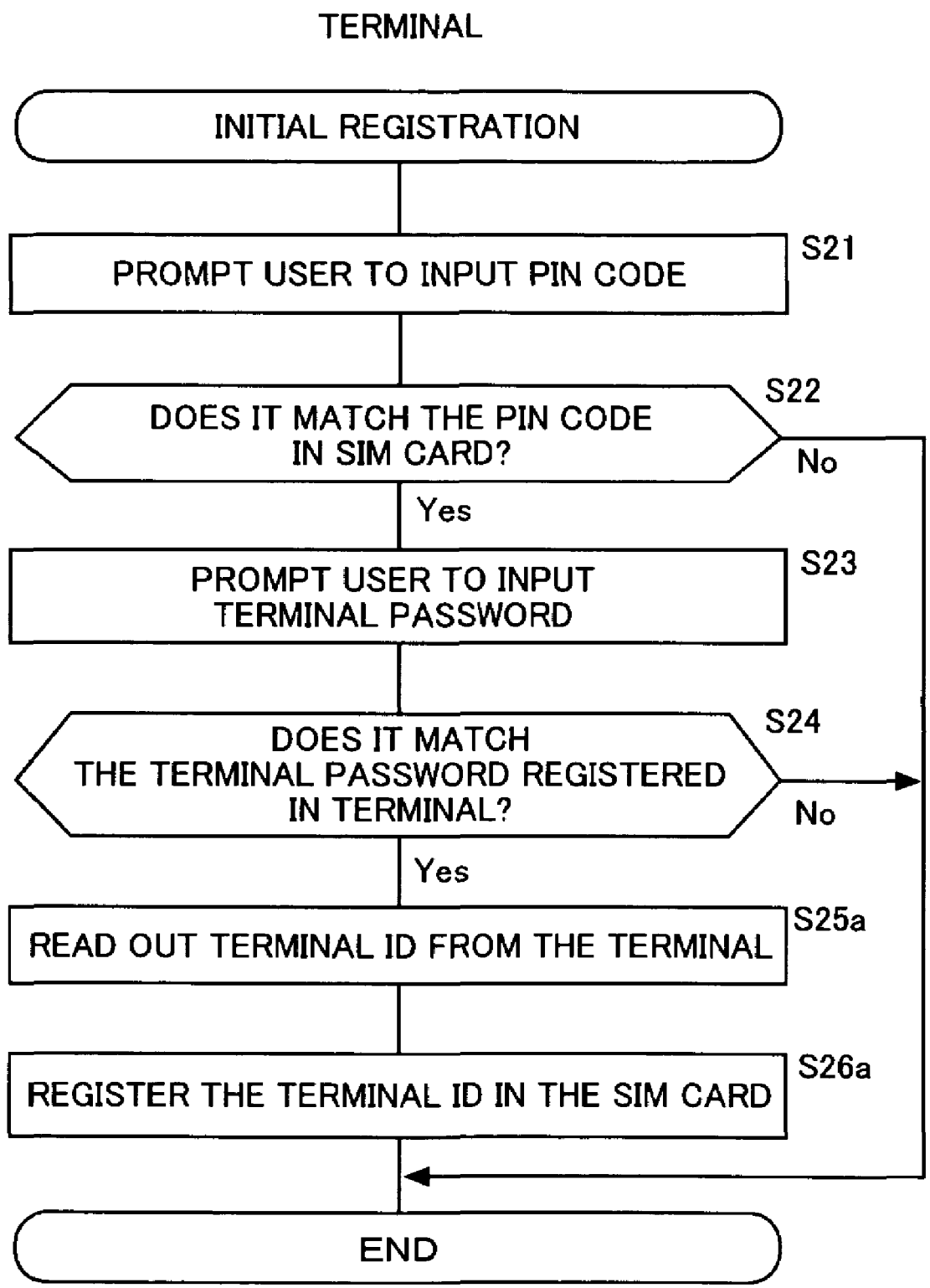
FIG. 11-A

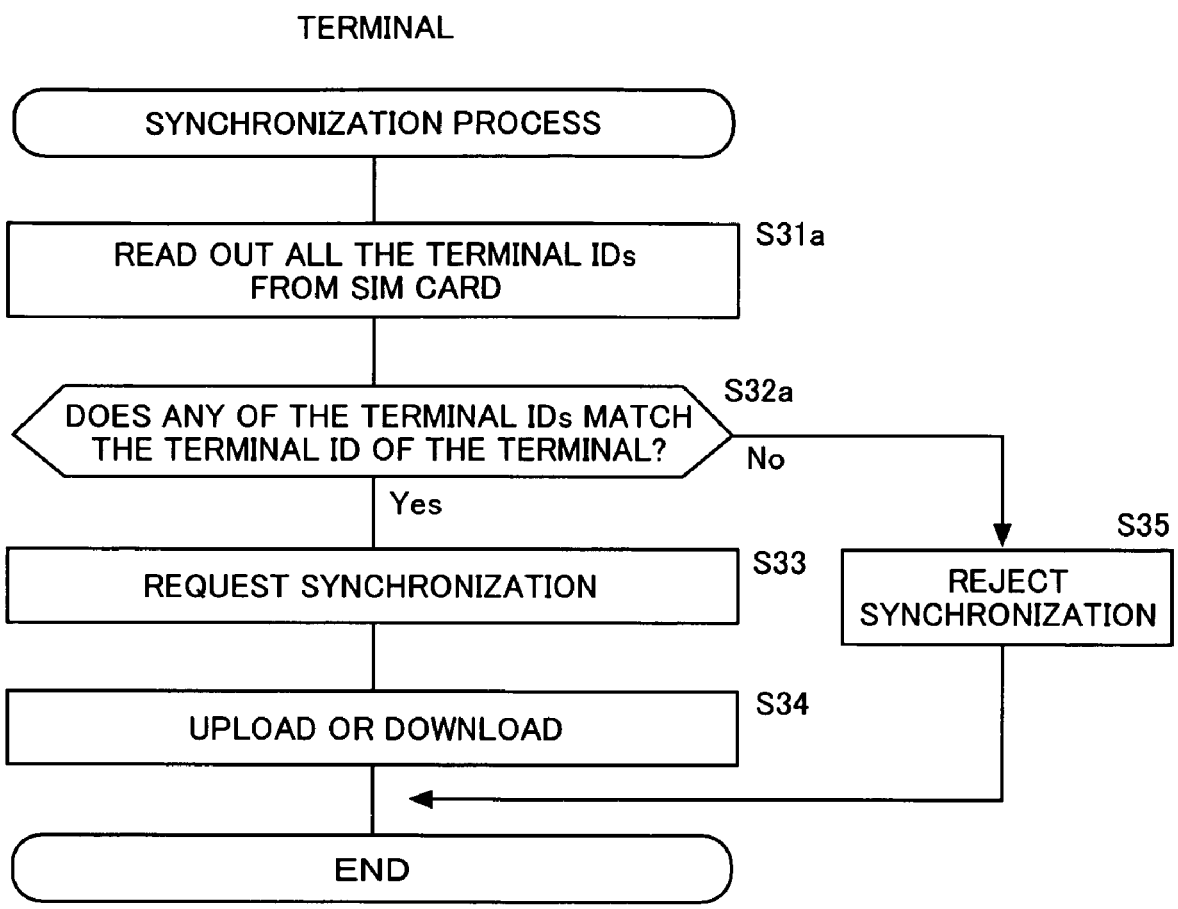
FIG. 11-B

WIRELESS COMMUNICATION TERMINAL SYNCHRONIZATION METHOD, WIRELESS COMMUNICATION SYSTEM, WIRELESS COMMUNICATION TERMINAL, AND SERVER

CROSS REFERENCE TO RELATED APPLICATIONS

This application is a 35 U.S.C. §371 National Stage filing of International Patent Application No. PCT/JP2005/003011, titled WIRELESS COMMUNICATION TERMINAL SYNCHRONIZATION METHOD, WIRELESS COMMUNICATION SYSTEM, WIRELESS COMMUNICATION TERMINAL, AND SERVER, filed Feb. 24, 2005, which claims the benefit of Japanese Application No. 2004-060257, titled WIRELESS COMMUNICATION TERMINAL SYNCHRONIZATION METHOD, WIRELESS COMMUNICATION SYSTEM, WIRELESS COMMUNICATION TERMINAL, AND SERVER, filed Mar. 4, 2004, both of which are incorporated herein by reference in their entireties.

TECHNICAL FIELD

The present invention relates to a wireless communication terminal (simply referred to as "terminal" in the present specification) such as a mobile phone terminal, at least communication operation of which is enabled by mounting thereon a subscriber information card on which subscriber information is recorded. More particularly, it relates to a method, a system, and an apparatus which perform synchronization among the wireless communication terminals in the case where an identical user selectively uses a plurality of such wireless communication terminals, by mounting and demounting the subscriber information card thereon and therefrom.

BACKGROUND ART

Conventionally, call contract information (hereinafter, referred to as "subscriber information") such as a phone number, user ID, and calling rate, is stored in the memory of a mobile phone terminal. In making a call, an exchange receives a notification about the phone number, and authentication of the subscriber and billing process are performed by using this phone number.

In recent years, there has been developed a system which employs a subscriber information card referred to as SIM (Subscriber Identity Module) card which stores the subscriber information in an IC memory card. The SIM may also be referred to as UIM (User Identity Module). This system is configured such that the subscriber information is not stored in the mobile phone terminal in itself and calling is disabled with the mobile phone terminal alone. By mounting a SIM card provided by contract onto the mobile phone terminal, the subscriber is allowed to use the mobile phone terminal with the phone number that is recorded in the card. With the configuration above, even when the mobile phone terminal is replaced with a new one, the SIM card can be mounted on the new mobile phone terminal, thereby allowing the user to make a call immediately with the new one. It is further possible to record on the SIM card, a list of phone numbers of callees in addition to the subscriber information.

On the other hand, the mobile phone terminal is growing and expanding in functionality, installing multifunction such as a standby screen, ringing tone replay, Web browsing, E-mail, built-in electronic camera, moving picture player/recorder, scheduler, execution of downloaded applications such as games. Therefore, a flash memory in the mobile phone, which is a non-volatile memory being rewritable, is designed to store a large volume of data, such as address book data including phone number and mail address, E-mail data, bookmark of browser, photo, sound, moving picture, downloaded application data, schedule data, and various set-up data.

Patent Document 1: Japanese Patent Laid-Open Publication No. 2002-57807

DISCLOSURE OF THE INVENTION

Problems to be Solved by the Invention

There is a prospect for the future that one user selectively uses plural mobile phone terminals depending on TPO (time, place and occasion), even though such usage has not become common yet at the present time. For example, one user may utilize different mobile phone terminals selectively depending on their appearances (e.g. design, brand, and the like), functions (e.g. water proofing, radio, television, music player, and the like), and intended use (e.g. business, vacation, and the like). In such a case above, it is considered as desirable that a predetermined data such as address book (including phone numbers, mail addresses, and the like) and mail data are usable in a similar manner on any of the mobile phone terminals, even after the replacement thereof.

As described above, a limited part of data such as address book data, or the like, are stored in the memory in an SIM card, whereby the data in the SIM card can be used as it is even after the mobile phone terminal is replaced with a new one. However, the data stored in the flash memory of the mobile telephone terminal remains therein and it cannot be used in the new terminal. On the other hand, the capacity of the memory in the SIM card is limited, and it is impossible in actuality to store in the SIM card all the various data being stored in the terminal as mentioned above.

Patent Document 1 discloses that data of individual phone directory in the terminal is wirelessly uploaded on a server, and when the terminal is replaced with a new one, or the phone directory data disappears, the data of individual phone directory is downloaded from the server to the terminal, whereby the individual use phone directory data can be immediately restored to its original state.

However, the technique described in the Patent Document 1 does not employ the SIM card, and there is no consideration about data synchronization among plural terminals when they are used selectively by mounting/demounting (inserting/removing) the SIM card on/from the terminal.

In addition, in the SIM card system, a subscriber is identified by using the subscriber information in the SIM card, and the phone number is also determined by the SIM card. Therefore, there is no association between the terminal and the subscriber, and thus it is necessary to consider protection of personal information. For example, even if the technique disclosed by the Patent Document 1 is applied to the SIM card system, it is possible to insert one's own SIM card to any other person's mobile phone terminal, and upload the other person's data stored in the flash memory of the terminal to one's own server. This may cause stealing of personal information by somebody else.

The present invention has been made in view of the above situations. In other words, the object of the present invention is to provide a wireless communication terminal synchronization method, wireless communication system, wireless communication terminal, and server, which synchronize user data among plural terminals, when one user selectively uses such plural terminals, by mounting and demounting a subscriber identification card thereon and therefrom, thereby enhancing the user's convenience in selectively using the plural terminals.

Another object of the present invention is to provide a wireless communication terminal synchronization method, wireless communication system, wireless communication terminal, and server, in which the user data can be synchronized among the plural terminals without causing a leak of personal information.

Means to Solve the Problem

The wireless terminal synchronization method according to the present invention is a method in which data stored in a memory in each of the plural wireless communication terminals is synchronized with each other, when a user selectively utilizes the plural wireless communication terminals by using a single subscriber information card, at least communicating operation in each of the wireless communication terminals being enabled by mounting thereon a subscriber information card that records subscriber information. This method includes the steps of: uploading from a first wireless communication terminal with the subscriber information card being mounted, to a server via a communication network, at least updated part of data which is stored in a memory in the communication terminal, in accordance with a user's request or automatically, updating contents in a user's data storage area with the data being uploaded, in the server, downloading the data to a second wireless communication terminal via the communication network from the server, the data being confirmed in accordance with a user's request or automatically, as data to be downloaded to the second wireless communication terminal from the server, after the subscriber information card having been demounted is mounted on the second wireless communication terminal, and updating the contents of the memory in the second wireless communication terminal, with the data having been downloaded from the server to the terminal.

It is preferable that at least the uploading as described above is allowed to be executed, under conditions that the user is confirmed to be an authenticated user of the subscriber information card, and the user is also confirmed to be an authenticated user of the terminal. With the configuration above, it is possible to prevent a leak of personal information by an unauthorized user.

It is preferable that at least the uploading as described above is allowed to be executed, under the condition that the wireless communication terminal that has requested the uploading is confirmed to be a terminal being associated in advance with the subscriber information card. With the configuration above, only the terminal which is set for the subscriber information card is allowed to execute the uploading.

Confirmation of the above conditions can be performed on the wireless communication terminal side, on the server side, or on both of them.

It is further possible to register a data attribute as a target for the above uploading and the downloading in advance in each wireless communication terminal, and only the data having its own registered data attribute is allowed to be a target for uploading and downloading in each terminal. With the configuration above, it is possible to omit executing synchronization of data having an unnecessary data attribute with respect to each terminal, thereby reducing useless processing load and communication cost.

As described below, the present invention may be taken as a wireless communication system, wireless communication terminal, and server which implement this wireless communication terminal synchronization method. Alternatively, the present invention may also be taken as a computer program which is executed by each of the terminal and the server.

Effect of the Invention

In the case where a user uses a single subscriber information card to selectively use plural wireless communication terminals, at least communication operation of which is enabled by mounting the subscriber information card that records subscriber information, a terminal on which the subscriber information card is mounted performs synchronization with the server, thereby synchronizing user data among the plural terminals, and the data is made consistent among the plural terminals. With the configuration above, when the user selectively uses plural terminals depending on TPO, any of the terminals is available in a state that the latest update is reflected on necessary data. Therefore, it is possible to enhance the convenience when the plural terminals are used selectively.

When the synchronization between the terminal and the server is executed, at least one of the terminal side and the server side performs authentication, whereby the synchronization occurs only among the terminals possessed by the subscriber being authenticated, and thus it is possible to prevent a leak of personal information.

BRIEF DESCRIPTION OF DRAWINGS

FIGS. 7(a) and (b) include illustrations showing configuration examples of subscriber managing database as shown in FIG. 2.

FIG. 10-A is a flowchart showing an example of initial registration executed initially for the synchronization on the terminal in an embodiment of the present invention.

FIG. 10-B is a flowchart showing an example of the synchronization process executed on the terminal side each time synchronization becomes necessary on the terminal after the initial registration as shown in FIG. 10-A is performed.

FIG. 11-A is a flowchart showing a variation of the example as shown in FIG. 10-A.

FIG. 11-B is a flowchart showing a variation of the example as shown in FIG. 10-B.

DESCRIPTION OF REFERENCE NUMERALS

2a . . . synchronization engine; 4 . . . wireless network interfaces; 5 . . . antenna; 6 . . . flash memory; 6a . . . personal information storage area; 6b . . . subscriber ID information registration area; 7 . . . display driver; 8 . . . display; 10,10a to 10c . . . wireless communication terminals; 11 . . . card reader writer; 12 . . . SIM card (subscriber information card); 13 . . . user interface device interface; 14 . . . user interface device; 15 . . . battery remaining amount detecting section; 16 . . . battery; 20 . . . communication network; 21 . . . base station; 22 . . . switching center; 24 . . . mobile phone network; 26 . . . gateway; 28 . . . Internet; 30, 30' . . . subscriber managing database; 50 . . . synchronization server; 51 . . . user data storage area

PREFERRED EMBODIMENTS OF THE INVENTION

Hereafter, details of preferred embodiments of the present invention will be explained with reference to the accompanying drawings.

Figure 1:
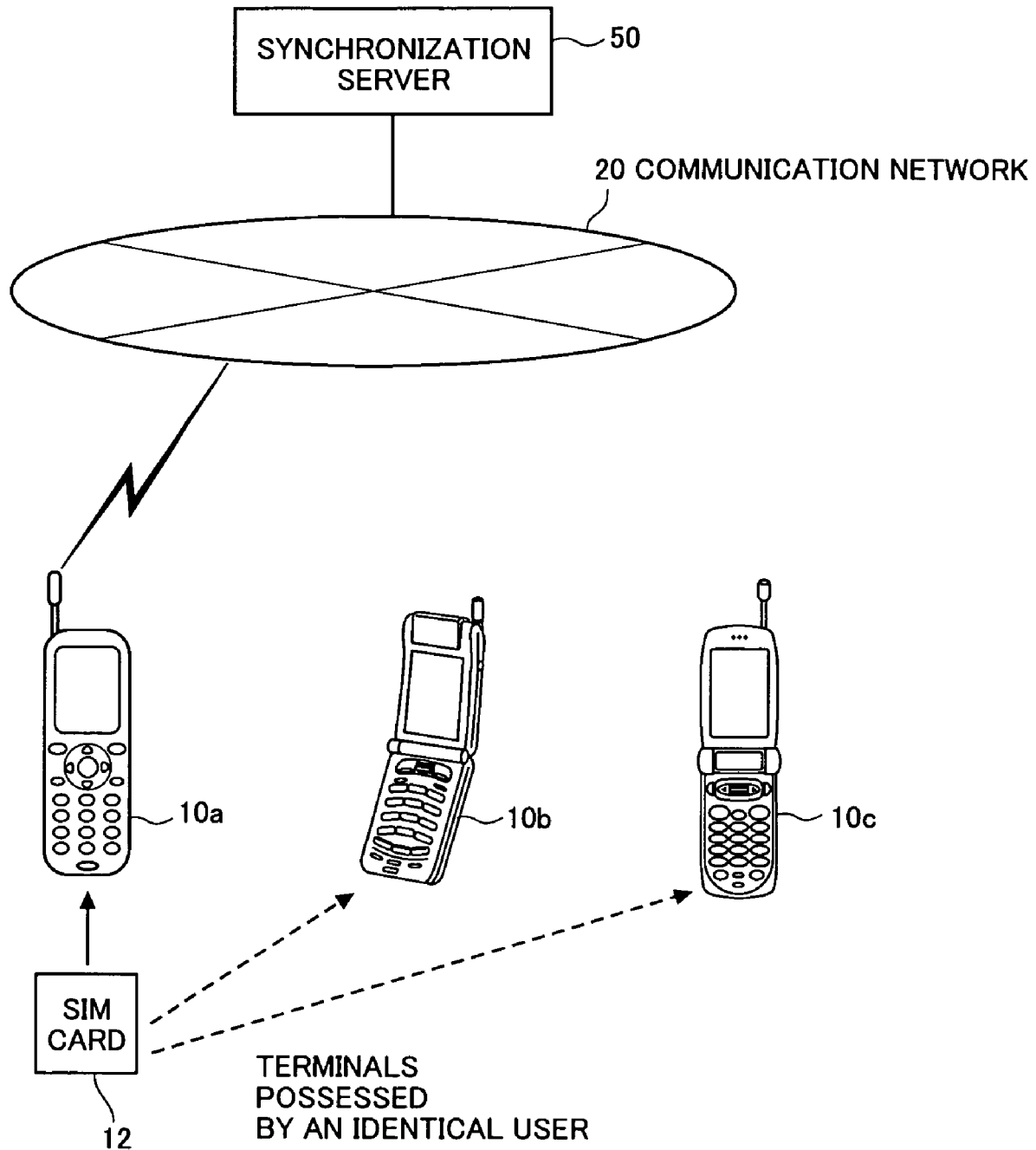
FIG. 1 is an illustration showing a schematic configuration of wireless communication system according to the present invention.

FIG. 1 shows a schematic configuration of the wireless communications system according to the present invention. In this system, an identical user possesses plural wireless communication terminals 10a, 10b, and 10c, and the user selectively uses those three terminals by mounting and demounting a single SIM card thereon and therefrom. Only one terminal on which the SIM card 12 is mounted, out of the three wireless communication terminals 10a, 10b, and 10c (hereinafter, also simply referred to as "terminals"), is enabled to perform wireless communication with the communication network 20 (via a base station that is not illustrated in FIG. 1). It is not directly related to the present invention whether or not all or part of the functions other than the communication is kept enabled on the terminal, from which the SIM card 12 has been demounted. However, it is preferable that at least operations such as generating and updating of personal information are disabled, including information created by the user himself or herself, sent/received information, and the like. It is to be noted, however, permission of such operations is not eliminated in the present invention.

Synchronization server 50 is connected to the communications network 20. The synchronization server 50 operates to maintain data consistency between the wireless communication terminal 10 on which the SIM card 12 is mounted and the synchronization server itself, and the synchronization server 50 is further provided with functions to assure the data consistency among the wireless communication terminals 10a, 10b, and 10c. In the present specification, the term "synchronization" means to achieve data consistency between the terminal and the server, or between the terminals as described above, so that updating of data on a certain terminal is reflected on another terminal. Data as a target for the synchronization is not necessarily the entire data, but only the data having a particular data attribute in accordance with a data type, a storage area, a creation application type, and the like, may be a target for the synchronization. In order to achieve such synchronization, the particular data attribute as a target of synchronization may be registered in advance. In addition, there may be various forms of specific means and operations for the synchronization, as described below.

Figure 2:
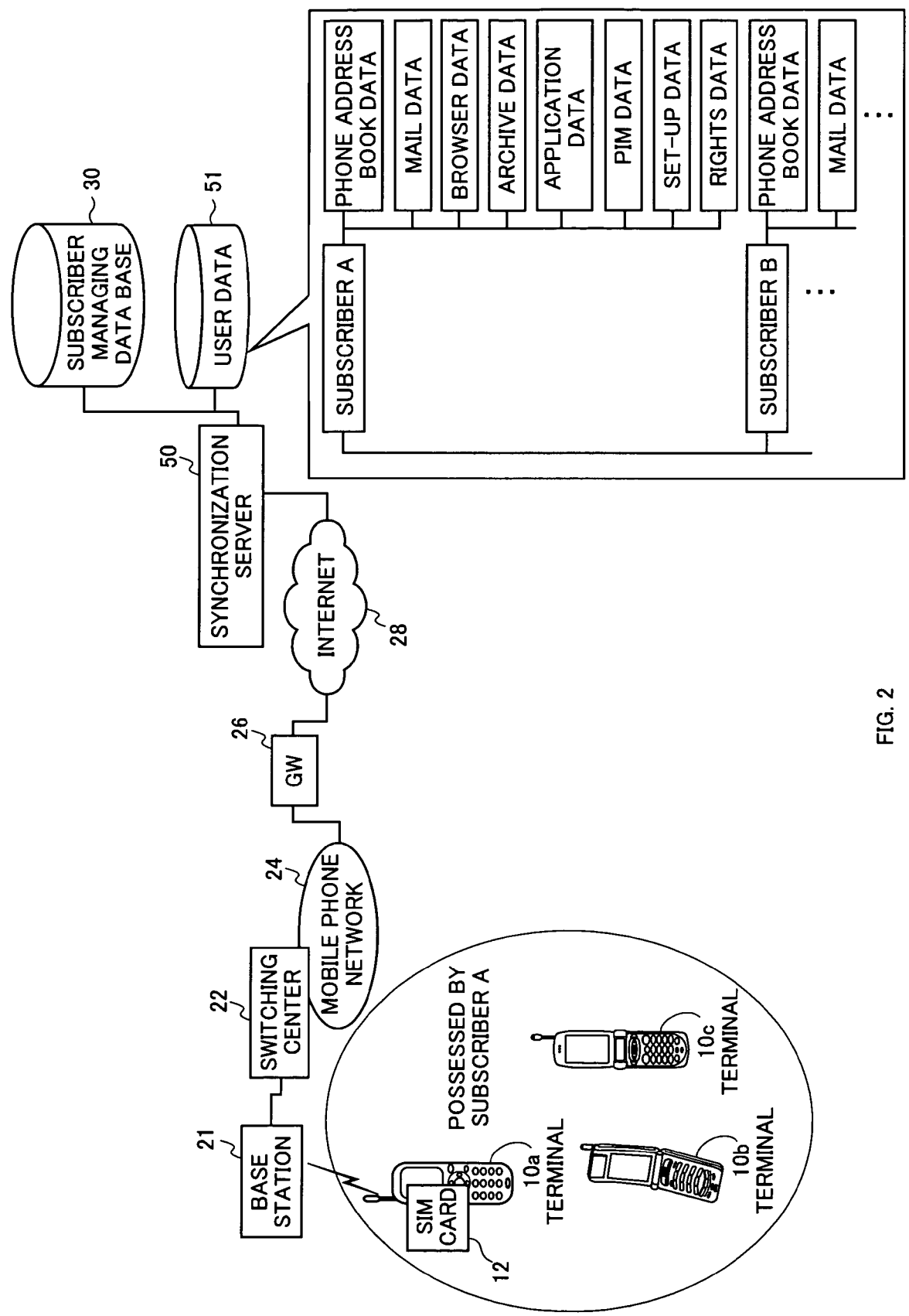
FIG. 2 is a block diagram showing a specific system configuration according to the first embodiment of the present invention.

FIG. 2 shows a specific system configuration of the first embodiment of the present invention.

The terminal 10 on which the SIM card 12 is mounted performs wireless communication with base station 21. The base station 21 is connected to mobile phone network 24 via switching center 22. The mobile phone network 24 is connected to the Internet 28 via gateway (GW) 26. The synchronization server 50 is connected to the Internet 28. The synchronization server 50 includes in its storage unit, subscriber managing database (DB) 30 and user data storage area 51. Functions and registered contents of the subscriber managing database (DB) 30 will be described below. The user data storage area 51 includes regions to store various data items that are uploaded from a terminal possessed by each subscriber. Such various data items may include phone address book data, mail data, browser data, archive data, application data, PIM data, set-up data, rights data, or the like.

The phone address book data may include a callee's name, phone number, mail address, and the like. The mail data may include a received mail, sent mail, unsent mail, and mail set-up information, and the like. The browser data may include a bookmark, a captured data, last page URL (i.e. an address of a page last browsed), and the like. The archive data may include data such as a photograph, sound, image, etc. The application data may include an application program downloaded from the communications network. The PIM data may include calendar information, schedule information, To-do information, and the like. The set-up data may include set-up information for ringing tone, set-up information for calling, and the like. The rights data may include license related information and the like regarding a right such as copyright.

Figure 3:
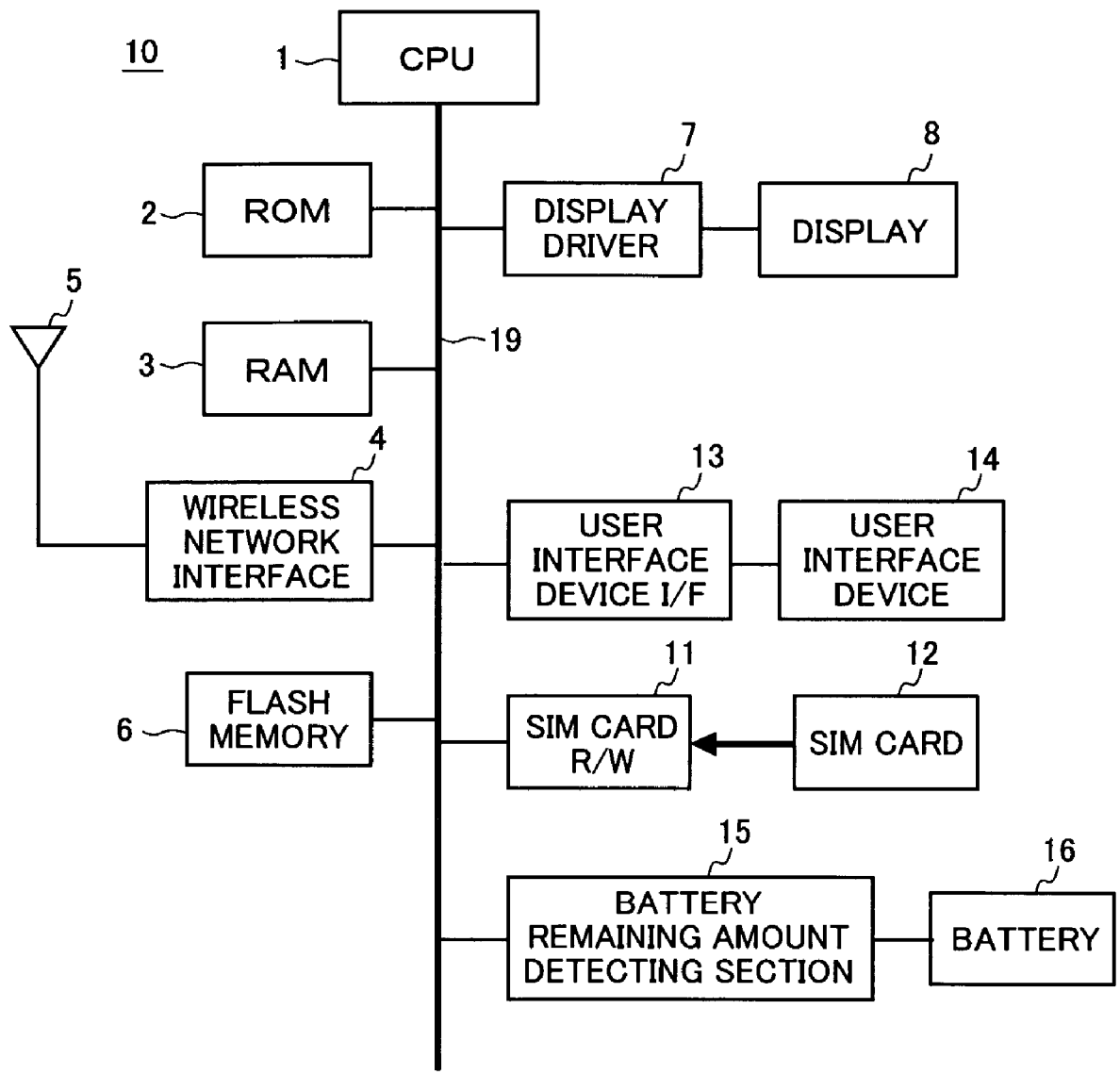
FIG. 3 is a block diagram showing a hardware configuration example of the wireless communication terminal in the system as shown in FIG. 1.

FIG. 3 shows a hardware configuration example of the wireless communication terminal 10. CPU (central processing unit) 1 executes programs to achieve the controlling of the terminal 10. ROM 2 is usually a memory provided specifically for reading, which stores control programs for the above operations, an application program initially equipped, and fixed data. RAM 3 is a readable and writable memory which provides a temporary storage space for data and work area. Wireless network interface 4 is a unit which performs audio and data communication wirelessly with the base station via the antenna 5. Flash memory 6 is a rewritable memory which stores various data items as described above in non-volatile manner. Display driver 7 is controlled by the CPU 1 to perform a processing for drawing various information items and for displaying on the screen of the display 8, which is a display section. User interface device interface (I/F) 13 is a unit to control I/O operations of user interface devices 14 such as key operation part including various operation keys, a microphone, and a speaker, under the control of the CPU 1. SIM card reader writer (R/W) 11 is a device which reads/writes data from/to the SIM card 12 being mounted. The SIM card reader writer 11 may also be provided with a means to detect the mounting and demounting (inserting and/or removing) of the SIM card 12. This terminal is activated by power from battery 16. Remaining amount of the battery 16 is detected by battery remaining amount detecting section 15. The CPU 1 is allowed to be aware of this lowering of the battery remaining amount.

Figure 4:
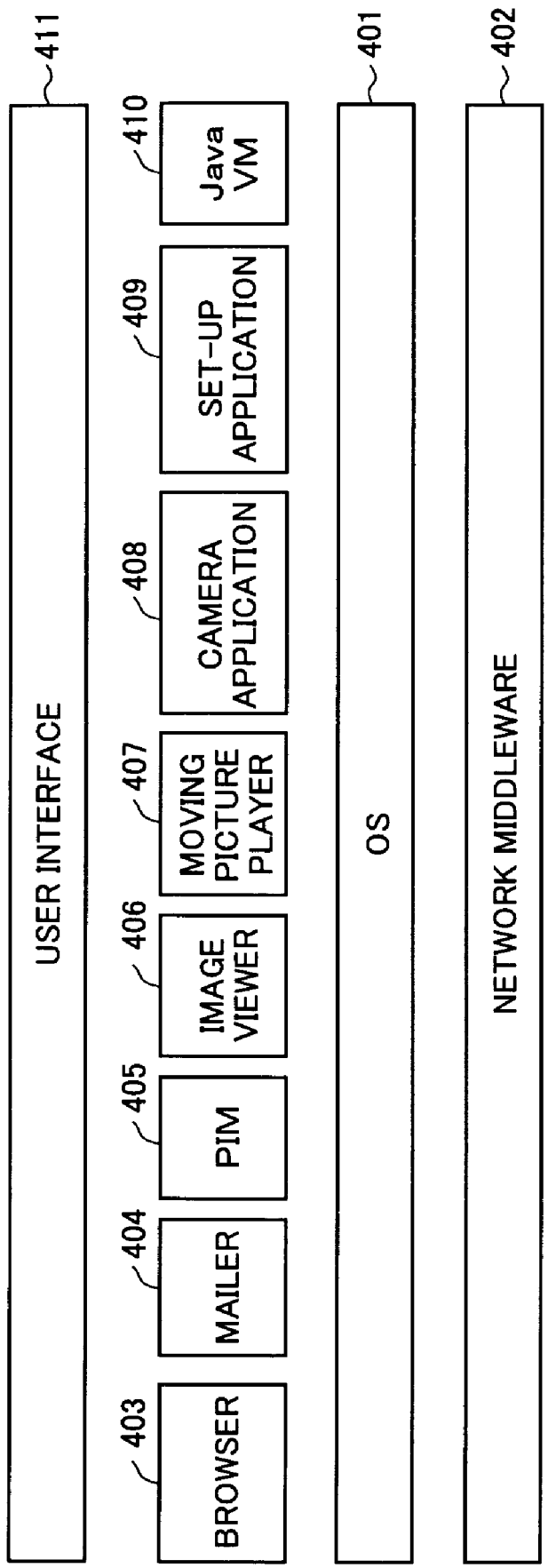
FIG. 4 is a diagram showing a software configuration example of the wireless communication terminal as shown in FIG. 3.

FIG. 4 shows a software configuration example of the wireless communication terminal 10. This software configuration has a hierarchy, and operating system (OS) 401 as a basic software is located at the center. Network middleware 402 to control the communication with the network is located below the OS 401. Various types of application software are located above the OS 401. In this particular example, such various types of application software may include browser 403, mailer 404, PIM 405, image viewer 406, moving image player 407, camera application 408, set-up application 409, and JAVA (registered trademark) VM 410. User interface 411 interacts with these various types of application software.

Figure 5:
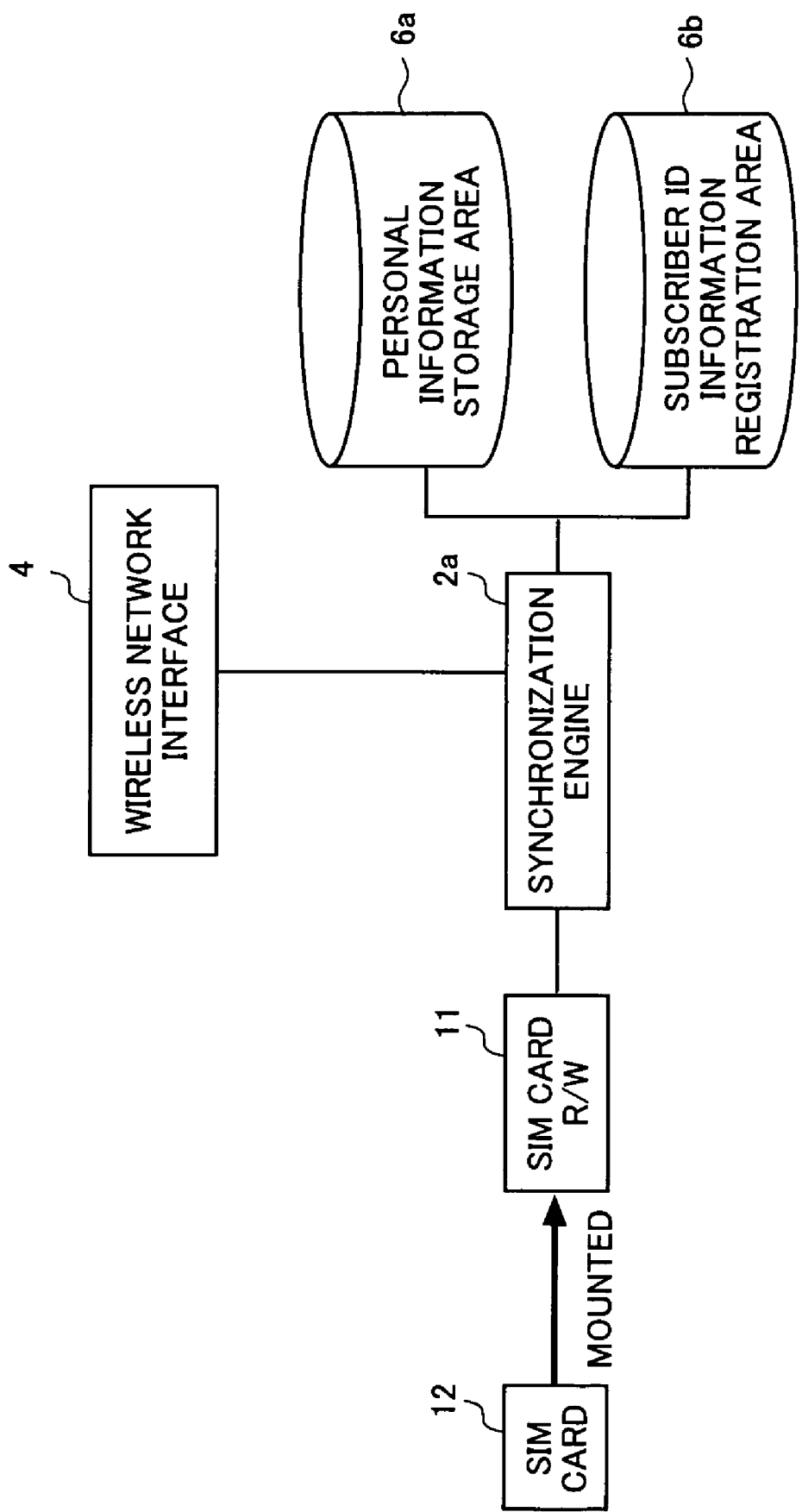
FIG. 5 is a schematic diagram showing a main functional portion related to the present invention, of the wireless communication terminal as shown in FIG. 3.

FIG. 5 is a schematic diagram showing a main functional portion of the wireless communication terminal 10, which is related to the present invention.

Figure 6:
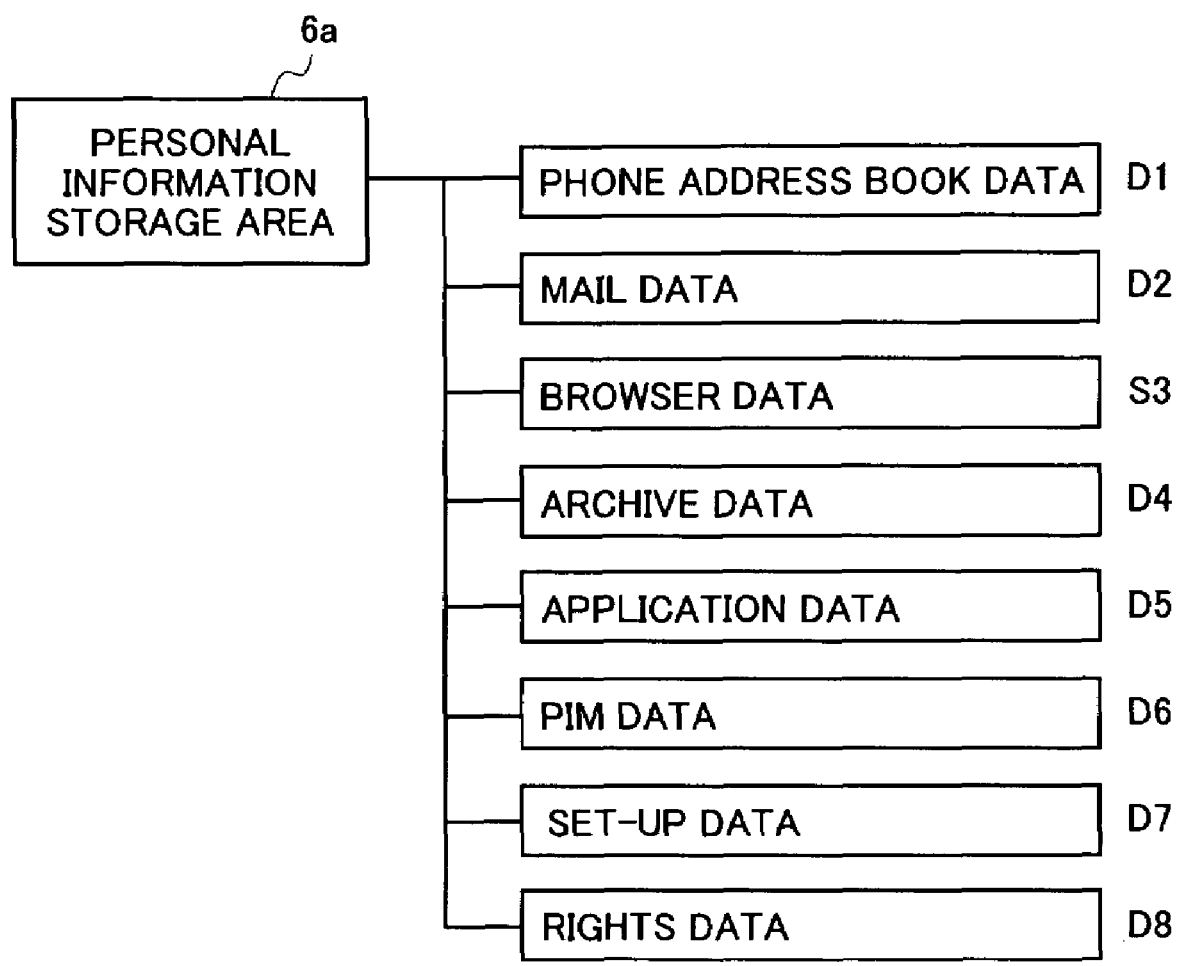
FIG. 6 is a diagram showing various data items in personal information storage area in the wireless communication terminal as shown in FIG. 3.

Synchronous operation of the wireless communication terminal 10 according to the present invention is realized by a software module which is referred to as synchronization engine 2a. The synchronization engine 2a is implemented when a program is executed by the CPU 1, and the synchronization engine 2a performs mainly a read operation to read the SIM card 12 via the SIM card reader writer 11. The synchronization engine 2a sends and receives (uploads and downloads) data, to and from the server via the communication network by the wireless network interface 4. In the case above, a data synchronization process is performed between the terminal and the server, for example, in accordance with a synchronization method known as name of "SyncML" (registered trademark). In the SyncML (registered trademark), only the data difference is transmitted, in order to reduce the amount of data to be transmitted. It is to be noted, however, the present invention is not limited to the data difference transmission. The synchronization engine 2a has personal information storage area 6a and subscriber ID information registration area 6b in the nonvolatile memory such as flash memory 6. As shown in FIG. 6, the personal information storage area 6a stores various data items which are sources for various data items stored in the user data storage area 51 of the synchronization server 50, having been explained with FIG. 2. Data items in the user data storage area 51 of the synchronization server 50 are subset of the entire data stored in the flash memory 6 in each of all the terminals 10a, 10b, and 10c. In the subscriber ID information registration area 6b, subscriber ID information and a terminal password, which will be described below, are registered.

FIGS. 7(a) and (b) show two configuration examples of the subscriber managing database. The subscriber managing database 30 is a data base to register various information items for managing a subscriber. In the example of FIG. 7(a), items of "subscriber ID", "terminal ID", and "terminal password", for each subscriber, are registered in the subscriber managing database 30. The "subscriber ID" is subscriber identification information that is uniquely assigned to the subscriber by the service provider. It is also possible to use a phone number as the subscriber ID. The "terminal ID" is terminal identification information which is uniquely assigned to each terminal, and recorded in the terminal. The "terminal password" is password information, which is set by the user for the terminal, and it is provided by the user with respect to each terminal ID.

Figure 15:
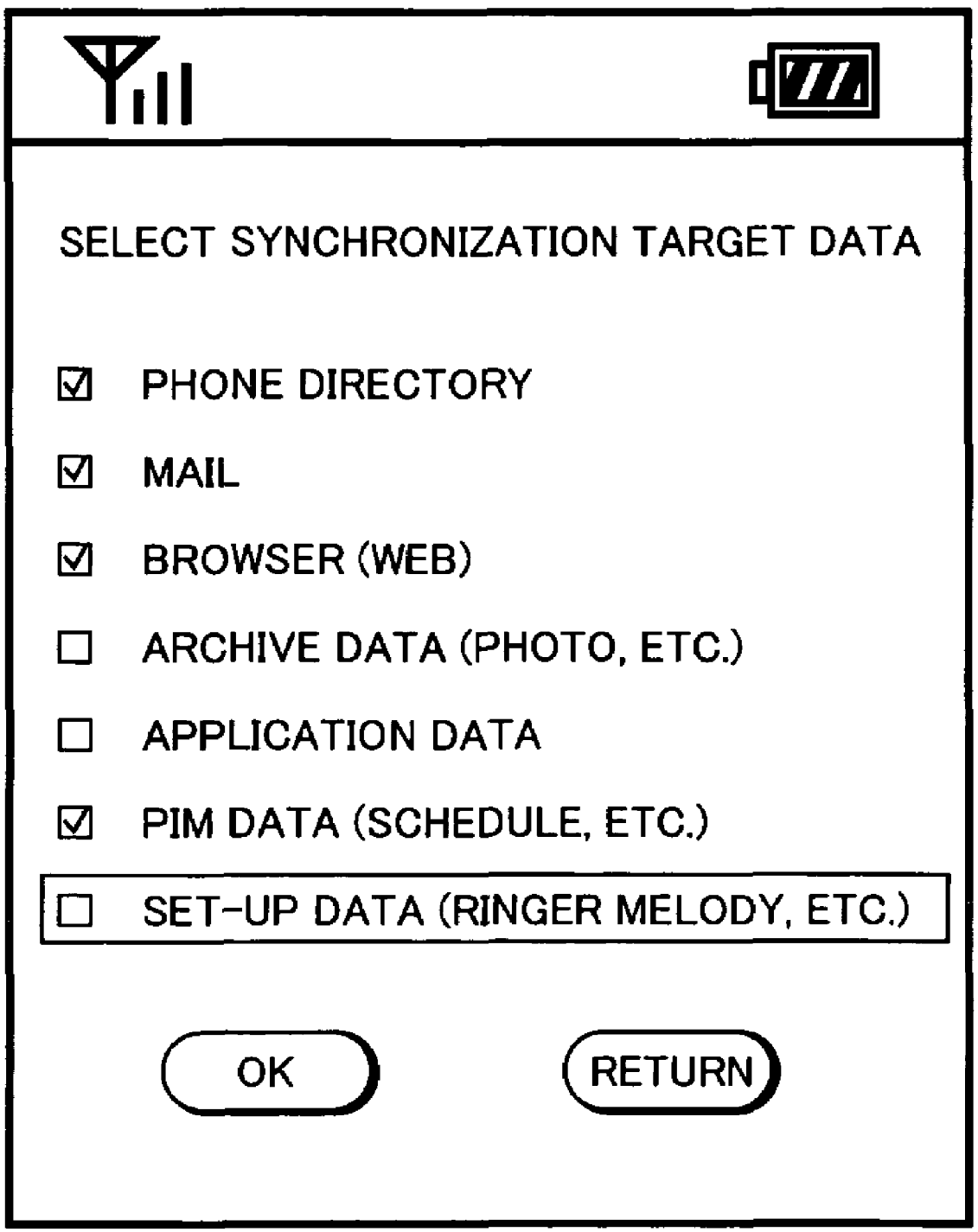
FIG. 15 is an illustration showing a screen example for allowing a user to select a data item as a target for synchronization.

In the example as shown in FIG. 7(b), in the subscriber managing database 30', items of "subscriber ID", "terminal ID", "terminal password", and "synchronization target data" are registered with respect to each subscriber. The "synchronization target data" being added is data which designates a data attribute to specify data as a synchronization target, and in the present embodiment, a user is allowed to designate data, by data types as shown in FIG. 6. For instance, in the example as shown in the figure, as for the second terminal IDa2 of the subscriber IDa, the synchronization target data is set to D1-D6, and D8, excluding D7 (set-up data). FIG. 15 shows a screen example allowing the user to make a selection from those synchronization target data items. In this screen example, a plurality of data types are displayed as selection candidates and the user is allowed to make a selection by placing a check mark. It is further possible that specific data (for example, rights data) is not selectable independently, but it follows a selection result of data (for example, application data), which is associated with this specific data. It is to be noted, however, that the synchronization target data is not limited to such data types as described above. For example, there may be a selection using another criteria such as a region where the data is stored (for example, on the basis of receiving data folder, such as a mail send box and a mail receive box), and data update timing (for example, data in recent several months).

Hereinafter, operations of the present embodiment will be explained.

Figure 8:
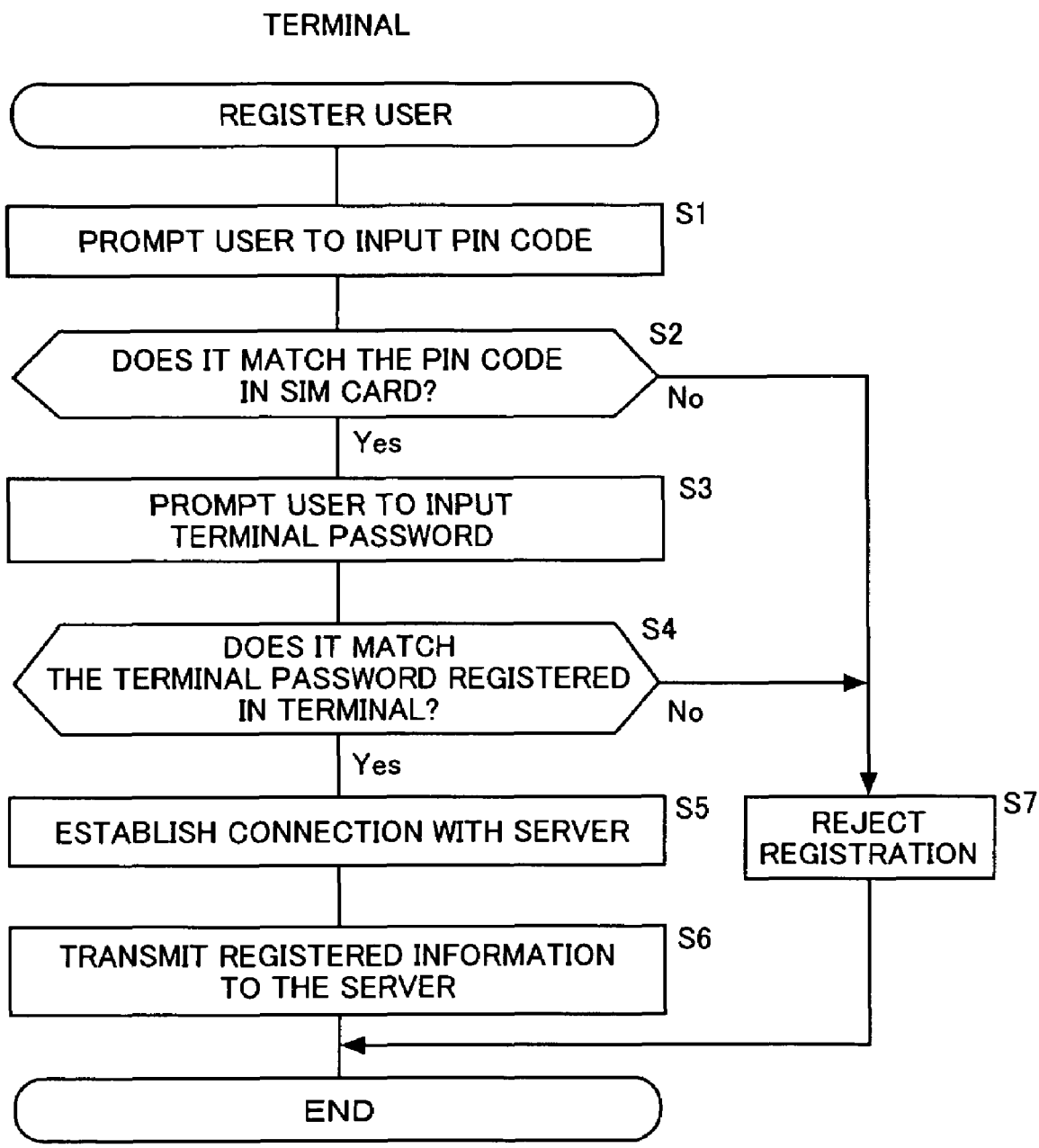
FIG. 8 is a flowchart showing an example of user registration process which is performed prior to using a synchronization service in an embodiment of the present invention.

In the present embodiment, user authentication is performed prior to executing the synchronization, in order to protect personal data. The user authentication described here is a process to check whether or not the user is an authenticated user (for example, being an owner) of a specific SIM card, and whether or not the user is an authenticated user of a specific terminal. For that purpose, prior to utilizing the synchronizing service by the synchronization server, it is necessary for the user to make the user registration to the server. FIG. 8 is a flowchart showing an example of such user registration process.

The terminal firstly prompts the user to enter PIN code on the display screen (S1). The PIN code entered by the user is collated with the PIN code and has been registered in the SIM card. This is to check whether or not the user is an authenticated user of the SIM card currently mounted. Generally, since inputting of the PIN code is prompted when the power of the terminal is turned ON, on which the SIM card is mounted, it is possible to omit inputting and collating of the PIN code when the user registration is performed.

If those PIN codes do not match each other, it is determined that the current user is not an authenticated user, and the user registration is rejected (S7). If it is confirmed that those PIN codes match each other, the user is prompted to enter a terminal password that is set in advance for the terminal (S3). This terminal password is also personal identification information that is set in advance by the authenticated user of the terminal. The terminal password entered by the user input is collated with a terminal password registered in the terminal. If the terminal passwords do not match each other, it is determined that the current user is not an authenticated user of the terminal, and the user registration is rejected (S7).

If it is confirmed that the terminal passwords match each other, connection to the synchronization server is established (S5), and predetermined registration information is transmitted (S6). At the time of connection to the synchronization server, if there is a login password previously allocated to the user, the synchronization server prompts the user to enter this login password. The synchronization server receives registration information, creates an entry of the user for the subscriber managing database 30 or 30', and registers the registration information. In addition, the synchronization server reserves a region to store data of the user. Items of the registration information are different depending on which database is used, the subscriber managing database 30 or 30' as shown in FIGS. 7(a), (b). In order to register the terminal ID, terminal password, and synchronization target data, the SIM card is inserted to each of the terminals as a synchronization target, from one to another, and the user registration as shown in FIG. 8 is executed. It is to be noted, however, that registration on a dedicated terminal placed in a terminal distributor is also available.

An address (URL) of the synchronization server on the network is stored in advance, along with the synchronization processing program that is installed in the terminal so as to implement the service of the present embodiment. If the subscriber managing database 30 is managed by a server, which is different from the synchronization server 50, the address of that server is used.

Figure 12:
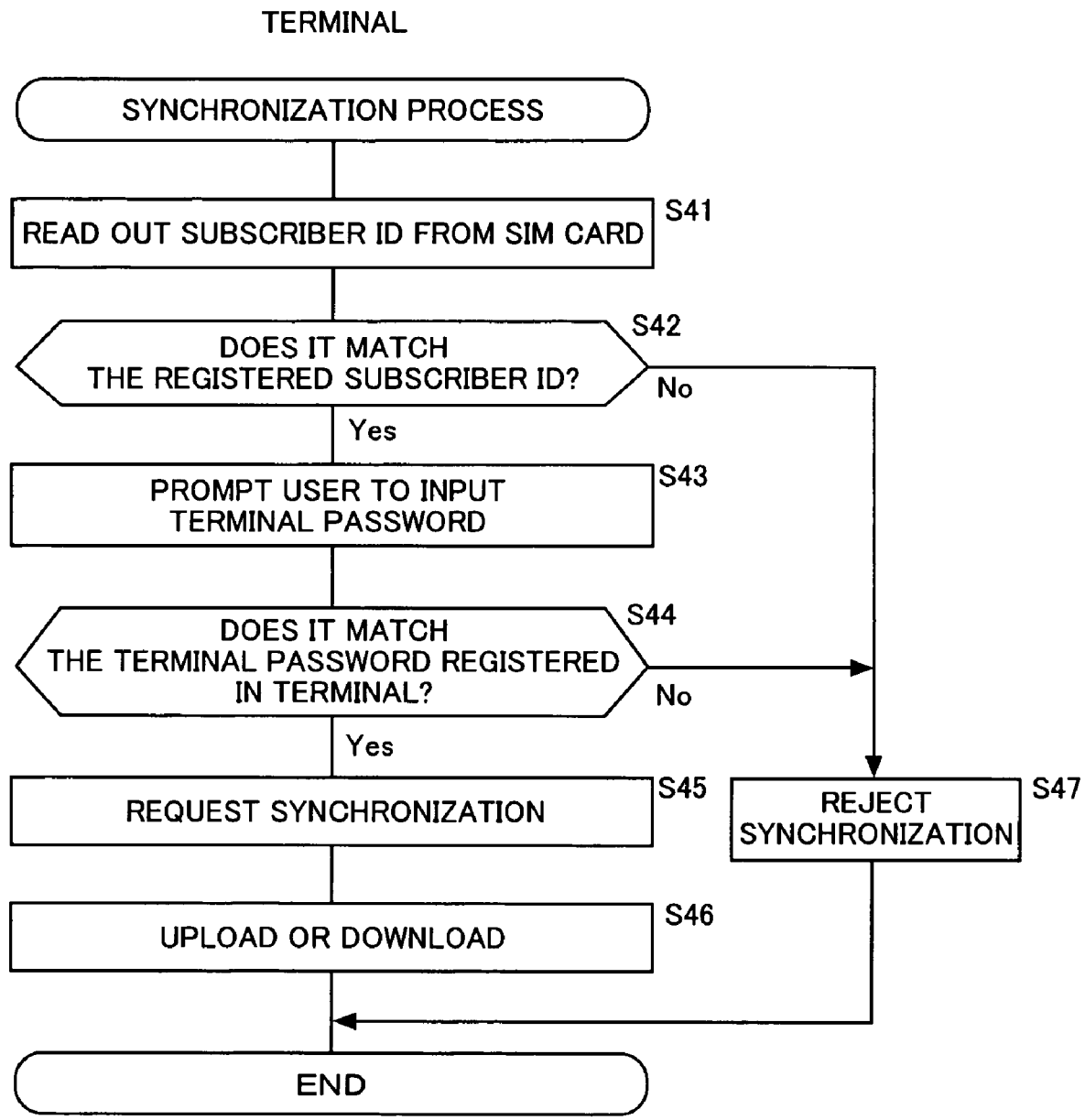
FIG. 12 is a flowchart showing another example of the synchronization process that is executed on the terminal side each time the synchronization becomes necessary on the terminal after the initial registration as shown in FIG. 10.
Figure 13:
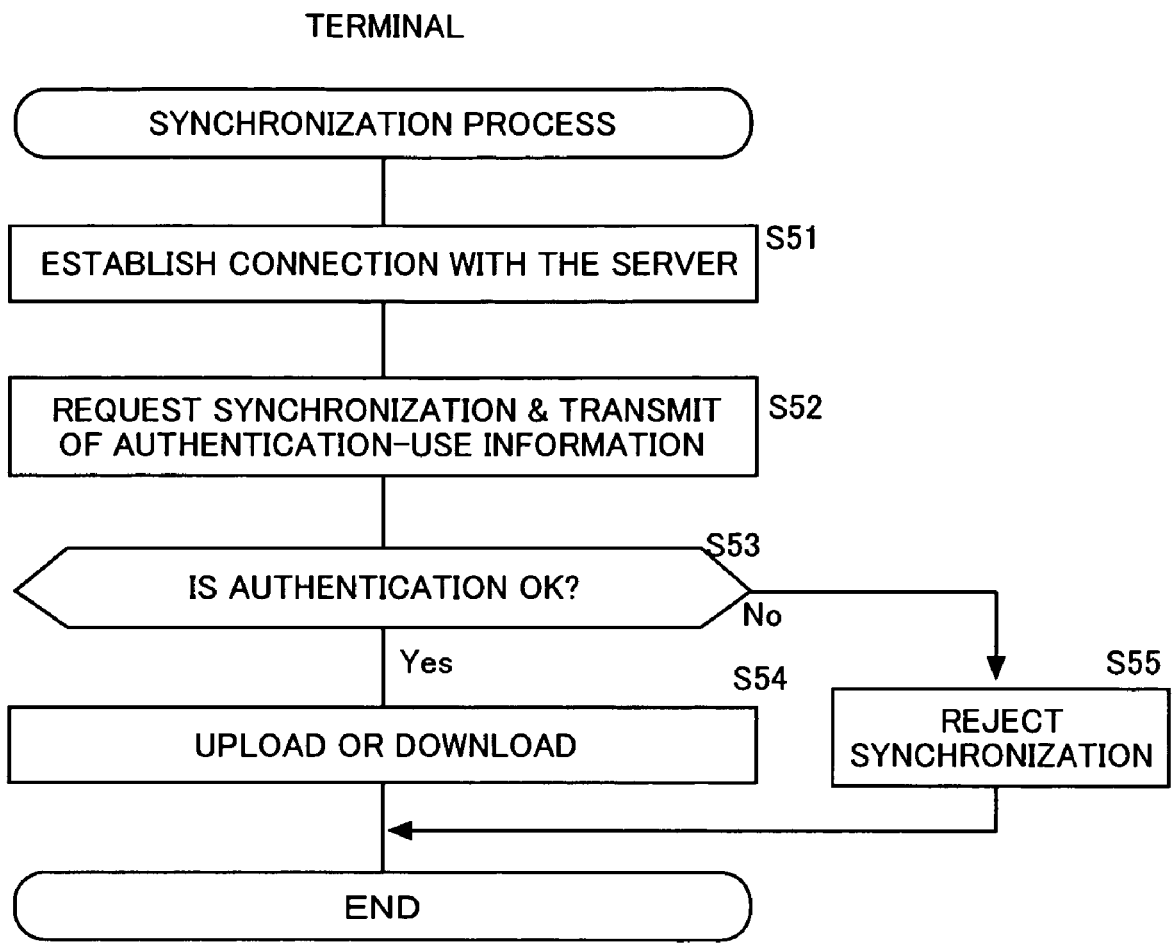
FIG. 13 is a flowchart showing an example of the synchronization process performed by the terminal each time the synchronization becomes necessary on the terminal, in the case where user authentication for the synchronization is performed on the server.
Figure 14:
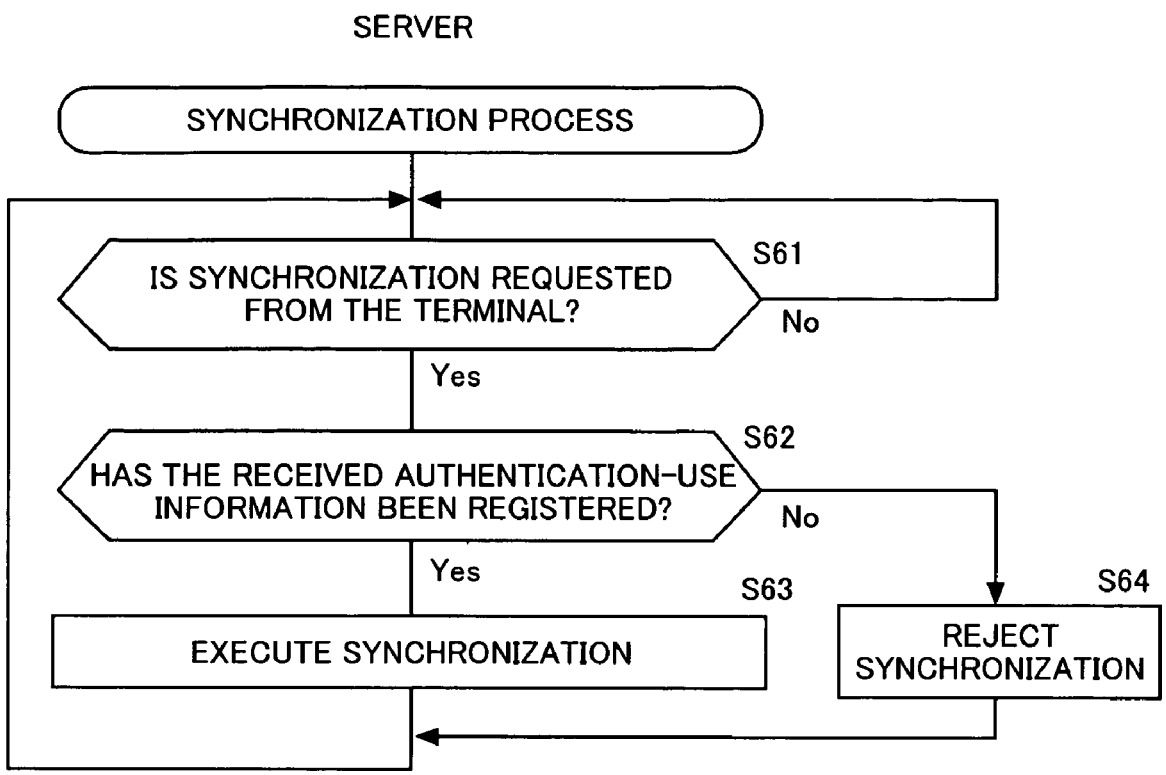
FIG. 14 is a flowchart showing an example of the synchronization process executed in the server, corresponding to the synchronization process in the terminal as shown in FIG. 13.

FIG. 9 to FIG. 15 show flowcharts showing the synchronization process according to the present embodiment. FIG. 9 to FIG. 12 show the situations where the user authentication is performed locally on the terminal side, and FIG. 13 to FIG. 15 show the situations where the user authentication is performed on the server side.

Prior to giving detailed descriptions of each flow, the timing when the synchronization with the server becomes necessary at the terminal will be explained in the present embodiment. For the synchronization of data between the terminal and the server, there are a way of uploading to transmit data from the terminal to the server, and a way of downloading for the terminal to receive data from the server. These two ways will be explained separately.

(a) Upload

There are considered the following uploading timings: (a1) when a directive is given from a user immediately before the SIM card is demounted from the terminal, (a2) after every lapse of predetermine period of time (periodically), (a3) each time data update is completed, (a4) when the update data amount excesses a predetermined amount, (a5) when a directive is given from a user arbitrarily, (a6) a combination of some of the above conditions, etc. Uploading at the timing as described above may be performed automatically, except the case of directive from the user. However, even in the case of such automatic uploading, permission from the user to execute the synchronization may be obtained. Alternatively, it is also possible to allow the user to make the initial set-up as to whether or not the permission is necessary. Except the timing (a3), the fact of data update is stored by using a flag or the like, as to the data that has been updated. Even for the case of timing (a1), it is further possible that an operation of the terminal (communication) is kept available until after the lapse of predetermined time period or the completion of the synchronization process, thereby enabling an automatic synchronization process, triggered by demounting of the SIM card.

(b) Download

As for the timing of download, it is performed automatically by detecting the time when the SIM card is mounted, or it is performed according to a directive from a user. In the present embodiment, there is no assumption that after the SIM card is once mounted on a certain terminal, the user data in the server is updated due to an operation on another terminal of the same user. Therefore, it is sufficient to perform downloading only one time after the SIM card is mounted, as a download for synchronization that is performed by mounting the SIM card on a terminal. However, it is also possible to perform the downloading as appropriate, not at the time of SIM card mounting, but by inquiring the server whether or not there is update data for particular data, when this particular data is accessed. In the case above, downloading is performed with respect to each different data attribute as required.

Only either one of the uploading and the downloading is not necessarily performed for the collective synchronization process. If the uploading and downloading for the synchronization are performed depending on the user's directive, rather than automatically, there is a possibility that the synchronization process may be omitted, even though there is update data on either one of the terminal and the server. For example, a case is assumed where the SIM card was demounted without performing synchronization process even though there was an update in the synchronization target data (for example, additional registration of phone number) in a terminal, and the SIM card is mounted again on the same terminal. The synchronization process for the case above may perform uploading of data from the terminal, as well as downloading the data from the server. If the user neglects to perform the synchronization, there is a possibility that updating is performed against old data, not the latest one, and a conflict in the update data may occur. Therefore, in order to prevent the situation as described above when manual synchronization is performed, if there is update data in the terminal, which has not been reflected to the server yet, it is preferable to prompt the user to reflect the update data to the server after it is updated, or to notify periodically the user of such updating. On the contrary, if there is update data on the server side, which has not been reflected to the terminal yet, it is preferable that when the SIM card is mounted on the terminal, the data in the server is checked, and when update data is found which has not been reflected to the terminal yet, the user is notified of this update data and prompted to instruct the synchronization.

Figure 9:
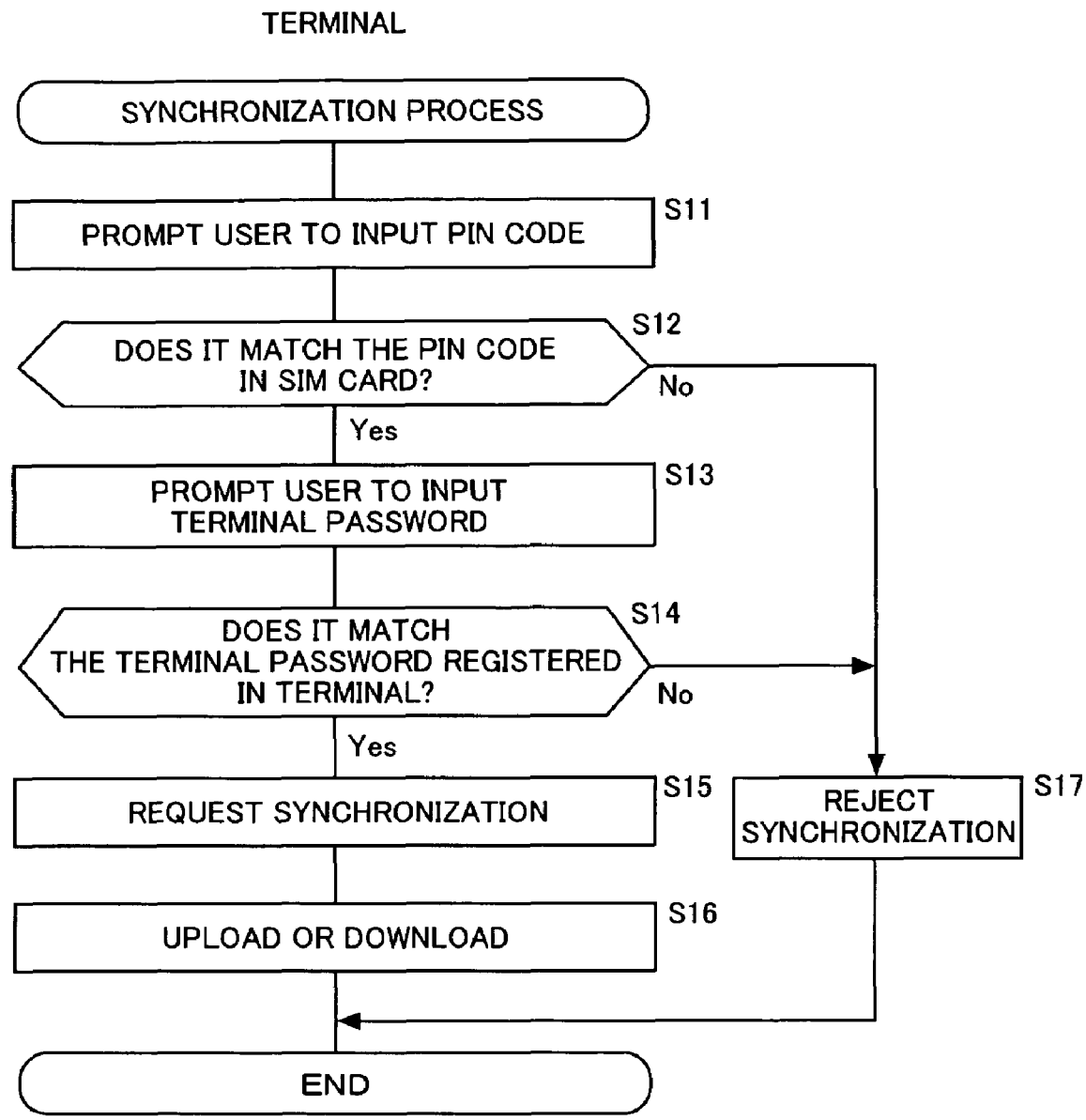
FIG. 9 is a flowchart showing an example of the synchronization process executed on the terminal side each time synchronization becomes necessary on the terminal in an embodiment of the present invention.

FIG. 9 is a flowchart showing an example of the synchronization process that is executed each time the synchronization becomes necessary on the terminal. This synchronization process is executed at the timing as described above. When execution of synchronization becomes necessary, a user is initially prompted to enter a kind of personal identification information on the display screen, the information being unique to an SIM card user who is assigned to the SIM card and referred to as a PIN code (S11). The PIN code entered by the user is collated with the PIN code that has been registered in the SIM card (S12). This is to check whether or not the user is an authenticated user of the SIM card that is currently mounted. Generally, since entry of the PIN code is requested when the power of the terminal is turned on, it is possible to omit the collation of PIN codes prior to the synchronization.

If the PIN codes do not match each other, it is determined that the current user is not an authorized user of the SIM card, and the synchronization is rejected (S17). Therefore, a synchronization request to the server is not made. After it is confirmed that the PIN codes match each other, the user is prompted to enter a terminal password that has been set to the terminal in advance (S13). The terminal password entered by the user is collated with the terminal password that has been registered in the terminal (S14). If the terminal passwords do not match each other, it is determined that the current user is not an authenticated user of the terminal, and the synchronization is rejected (S17). Also for this case above, a synchronization request to the synchronization server is not made.

When it is confirmed that the terminal passwords match each other, a synchronization request is made to the synchronization server (S15). Accordingly, uploading or downloading of the update data is performed with the server (S16). In the server, the data being uploaded updates the contents in the data storage area of the user. On the other hand, in the terminal, the data downloaded from the server updates the contents in the memory in the terminal. At the time of requesting synchronization to the server, the terminal transmits to the server at least the subscriber ID information, and allows the server to identify the subscriber who is a target of the synchronization. It is further possible that the terminal password is transmitted to the server at the time of requesting synchronization, and the user authentication using the terminal password may also be performed on the server side, in addition to the user authentication on the terminal.

When the synchronization is executed, if there is update data which has not been reflected to the server yet, the terminal uploads that data to the server. On the other hand, if there is update data, in the server, which has not been reflected to the terminal yet, the terminal downloads that data from the server, and stores the data in the memory in the terminal. According to the procedure as described above, synchronization between the terminal and the server is completed. Then, as for the synchronization target data on the terminal, the data on the terminal and the data on the server match each other, where the data is the most up-to-date.

FIG. 10-A is a flowchart showing an example of an initial registration that is executed on the terminal initially for the synchronization. In the synchronization process as shown in FIG. 9, the user is prompted to enter the PIN code and the terminal password, basically each time the synchronization is executed. However, in the initial registration as shown in FIG. 10-A, the subscriber ID is registered in the non-volatile memory in the terminal (i.e. subscriber ID information registration area 6b as shown in FIG. 5), only once on the first stage as to each terminal. In order to allow only an authenticated user of the SIM card and the terminal to perform the registration above, request for PIN code entry (S21), collation of PIN codes (S22), request for terminal password entry (S23), and collation of terminal passwords (S24) are executed. Only when matching of all the entered items is confirmed, the subscriber ID is readout from the SIM card (S25), and it is registered in the terminal (S26). According to the procedure above, a particular terminal is brought to be associated with the SIM card.

FIG. 10-B is a flowchart showing an example of the synchronization process that is executed each time the synchronization becomes necessary on the terminal side after the initial registration as shown in FIG. 10-A is performed. When the execution of the synchronization becomes necessary according to a user's directive or automatically, the terminal reads out the subscriber ID from the SIM card that is mounted on the terminal (S31). On the other hand, the subscriber ID registered at the initial registration as shown in FIG. 10-A in the terminal (i.e. subscriber ID information registration area 6b) is read out from the terminal, and it is collated with the above subscriber ID of the SIM card (S32). If the subscriber ID is unregistered in the terminal, or these subscriber IDs do not match each other, it is determined that the SIM card is mounted on an unexpected terminal (i.e. a terminal which is not set for executing the synchronization), and the synchronization is rejected (S35). If these subscriber IDs match with each other, it is found that the terminal is associated with the SIM card and expected to perform synchronization among terminals. Then, the terminal makes a request of synchronization to the server (S33). Accordingly, uploading or downloading of the update data is performed with the server (S34).

In the processing as shown in FIG. 10-B, the user is not prompted to enter the terminal password or the like, at each time when the synchronization is executed. After the initial registration as shown in FIG. 10-A is performed, if the terminal is stolen, lost, or the like, while the SIM card remains being inserted and the power is ON, there is a possibility that the data is browsed on the terminal. However, the synchronization process is performed with the data storage area (i.e. user area) of the authenticated user in the server. Therefore, there is no possibility that the data is stolen.

FIG. 11-A shows a variation example of the processing that is shown in FIG. 10-A. Processing steps identical to those in FIG. 10-A are labeled the same, and tedious explanations will not be made. In the process as shown in FIG. 10-A, the correspondence between the SIM card and the terminal is stored on the terminal side. In FIG. 11-A, however, it is stored on the SIM card side. As thus configured, after matching of the terminal passwords is confirmed, a terminal ID is read out from the memory in the terminal (S25a), and this terminal ID is registered in the memory in a SIM card (S26a). In this processing, one SIM card stores plural terminal IDs therein with respect to plural terminals used by the user.

FIG. 11-B is a variation example of the processing as shown in FIG. 10-B, and it shows a synchronization process on the terminal after the initial registration as shown in FIG. 11-A is performed. Processing steps identical to those in FIG. 10-B are labeled the same, and tedious explanations will not be made. In the process as shown in FIG. 10-B, the terminal IDs of all the terminals are read out from the SIM card (S31a), and it is checked whether or not any one of the terminal IDs matches the terminal ID that is recorded in the terminal (S32a). If there is a matching, it is found that that matching terminal ID indicates a terminal which is associated with the SIM card and set for the synchronization among terminals.

After the initial registration as shown in FIG. 10-A or FIG. 11-A, in the case where the terminal is stolen, lost, or the like, while the SIM card remains inserted and the power is ON, it is necessary to prevent the execution of synchronization. To this end, FIG. 12 shows another example of the synchronization process that is executed on the terminal side each time the synchronization becomes necessary on the terminal after the initial registration. This example includes not only reading out of the subscriber ID from the SIM card (S41) and collation (S42), but also prompting of terminal password entry (S43) and collation of this entered password with the terminal password registered in the terminal (S44). When matching of the terminal passwords is confirmed, the synchronization request is made (S45), whereby uploading or downloading of the update data is performed with the server (S46). If there is no matching, the synchronization is rejected (S47).

Generally, a processor is mounted also in the SIM card, and at least a part of the processing on the terminal as shown in FIG. 9 to FIG. 12 may be implemented as a processing executed by the processor in the SIM card. Therefore, it is assumed that the processing on the terminal as described in the present specification and the appended claims can include a processing performed in the processor in the SIM card.

FIG. 13 shows one example of the synchronization process that is carried out on the terminal side each time the synchronization becomes necessary on the terminal, in the case where the user authentication for the synchronization is performed on the server. When the terminal requires synchronization automatically or according to manual directive, the terminal establishes connection with the server (S51). Next, a synchronization request is made to the server, and authentication-use information is transmitted thereto as well (S52). Here, the authentication-use information may be a subscriber ID and a terminal ID, for instance. In addition to the above information items, it may also be possible to prompt the user to enter the terminal password and/or PIN code, so that they can be utilized all together. (In this case, the terminal password and PIN code of the user are stored in the server in advance). If a result of the authentication performed on the server on the basis of this authentication-use information is "OK" (S53, Yes), then uploading and downloading of the update data are performed (S54). If the result of the authentication is "NG", it is displayed that the synchronization is rejected (S55).

FIG. 14 is a flowchart showing an example of the synchronization process that is executed on the server, which corresponds to the synchronization process on the terminal as shown in FIG. 13. The server waits for a request for synchronization from a terminal (S61), and upon receipt of the request, it is checked whether or not in the subscriber managing database 30, 30' there is registered authentication-use information that matches the authentication-use information being received (S62). For example, by checking the subscriber ID and the terminal ID, it is possible to confirm that a registered user tries to perform synchronization for the registered terminal that is associated with the SIM card. In addition, if entry of a terminal password is prompted and it matches the registered terminal password, it is possible to assume that the user is an authenticated user of the terminal. If entry of a PIN code is prompted and it matches the registered PIN code, it is possible to assume that the user is an authenticated user of the SIM card. According to a specification of the service or according to a selection by the user at the initial set-up, it may be predetermined to what extent the security is required.

Figure 16:
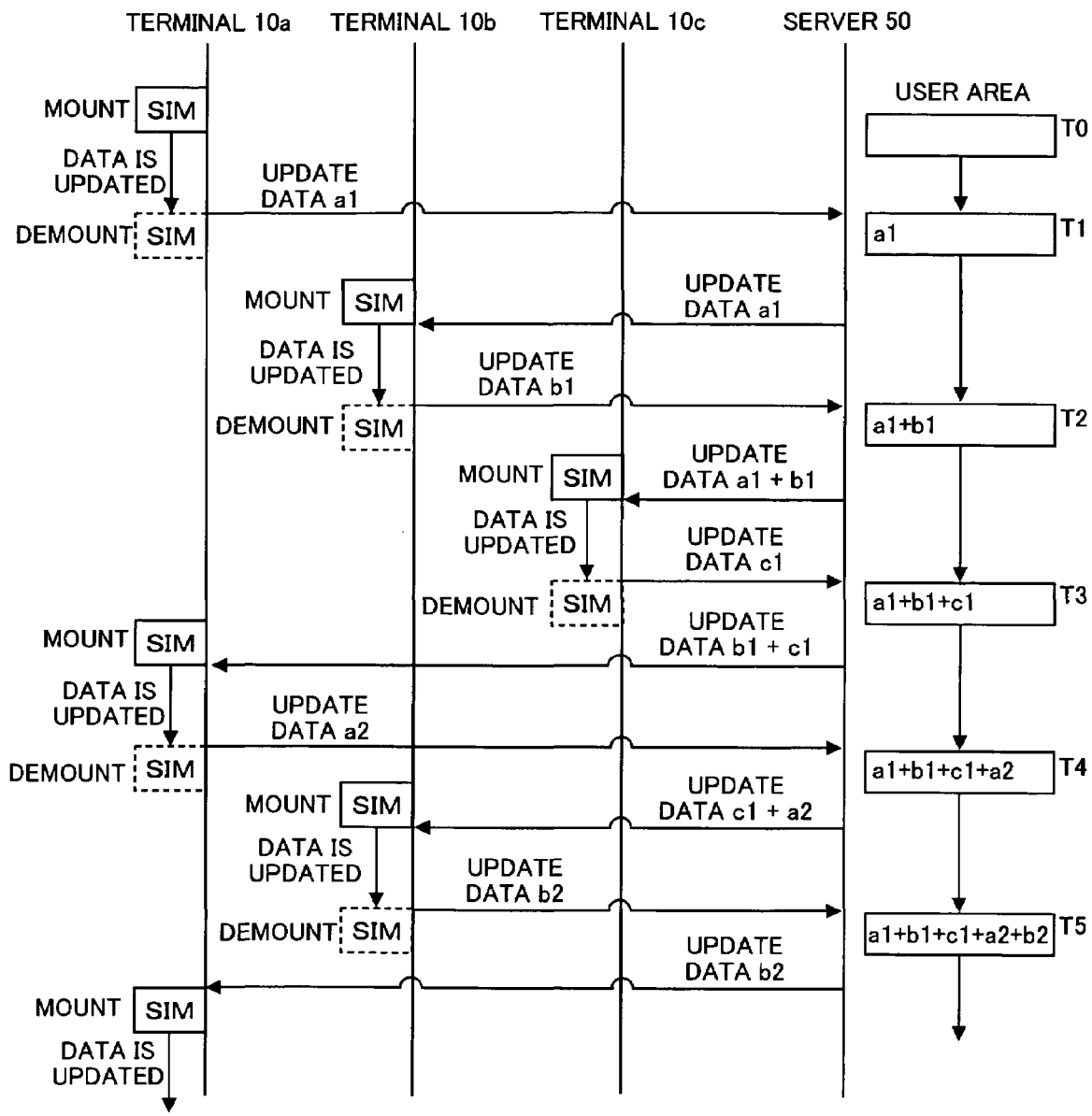
FIG. 16 is a sequence diagram showing a specific example of the synchronization performed when the user selects one of three terminals for usage, the three terminals being possessed by the user.

FIG. 16 is a sequence diagram showing a specific example of the synchronization that is carried out when the user selectively uses three terminals 10a, 10b, and 10c that are possessed by the user.

Here, it is assumed that at the point T0, an SIM card is mounted on the terminal 10a, and for the sake of convenience, the user area in the user data storage area 51 in the server 50, being associated with the subscriber, is in "empty" state indicating that there is no data. In addition, timing of the synchronization is set to be the time when the SIM card is demounted and mounted. Furthermore, all the data is assumed to be synchronization target.

In the case where update data a1 as synchronization target data is generated when the user utilizes the terminal 10a, the update data a1 is uploaded into the user area of the server 50 at the time when the SIM card is demounted (point T1). At this stage, contents of the data in the user area become "a1". It is to be noted here that "update data" includes not only addition of data or change of data, but also deletion of data. In the case of deletion, corresponding data in the server 50 is deleted, not uploaded, but it is also referred to as "uploading" for the sake of convenience. The same thing can be said for downloading.

Next, it is assumed that the SIM card is mounted on the terminal 10b. At this stage, the update data a1 is downloaded to the terminal 10b. The situation above indicates that the state of data in the terminal 10a is in conformity with that of the terminal 10b. After the terminal b1 is used and the update data b1 is generated, the update data b1 is uploaded and reflected to the user area at the time when the SIM card is demounted from the SIM card (point T2). Then, the contents of the data in the user area become "a1+b1".

Next, it is assumed that the SIM card is mounted on the terminal 10c. In this situation, the update data "a1+b1" is downloaded to the terminal 10c, and this data is reflected in the terminal 10c. As for the terminal 10c, it is also assumed that the SIM card is demounted at the point T3, after the data updating has been executed. At this stage, the update data c1 of the terminal 10c is uploaded to the server 50, and it is reflected to the user area. Then, the contents of the data in the user area become "a1+b1+c1".

Next, it is assumed that the SIM card is mounted on the terminal 10a. At this stage, the update data "b1+c1" having not been reflected yet, is downloaded in the terminal 10a. After update data a2 is further generated in the terminal 10a, the update data a2 is uploaded to the server 50 when the SIM card is demounted (point T4) and it is reflected to the user area. At this stage, the contents of the data in the user area become "a1+b1+c1+a2".

It is assumed that the SIM card is further mounted on the terminal 10b. At this stage, the update data having not been reflected to the terminal 10b is "c1+a2", and this update data is downloaded to the terminal 10b. It is assumed that the SIM card is demounted at the point T5, after new update data b2 is generated in the terminal 10b. At this moment, the update data b2 is uploaded to the server 50, and it is reflected to the user area. At this stage, the contents of the data in the user area become "a1+b1+c1+a2+b2".

Subsequently, a case is assumed where the SIM card is mounted on the terminal 10a. Since only the update data b2 has not been reflected yet to the terminal 10a at this timing, the update data b2 is downloaded to the terminal 10a.

As thus described, data becomes consistent between the terminal and the user area of the server, every time the synchronization is executed, as to each of the terminals which the SIM card is mounted on and demounted from. Consequently, it is possible to achieve data consistency (synchronization) among plural terminals.

Here, the user area is assumed to be empty at the point T0. However, if there already exists data and there is a terminal targeting the data for synchronization, the data is downloaded to the terminal, as long as the data does not exist in the terminal at the time of executing the synchronization.

So far, it has been assumed the case in which only the terminal on which the SIM card is mounted out of the three terminals 10a, 10b, and 10c is used by the user. However, even in situation where the SIM card is not mounted, if a function other than the communication is available (for example, camera-shooting function, schedule updating function, or the like), there is a possibility that update data may be generated in the terminal on which the SIM card is not mounted. Even for the case above, when the SIM card is mounted on such a terminal, the synchronization can be performed by not only downloading but also uploading between the user area in the server 50 and the terminal. In addition, in the case where data updating is tried to be performed in the terminal on-which the SIM card is not mounted and this updating may cause data conflict with another terminal, it is desirable to issue a warning (for example, displaying a message) indicating that data conflict may occur.

Figure 17:
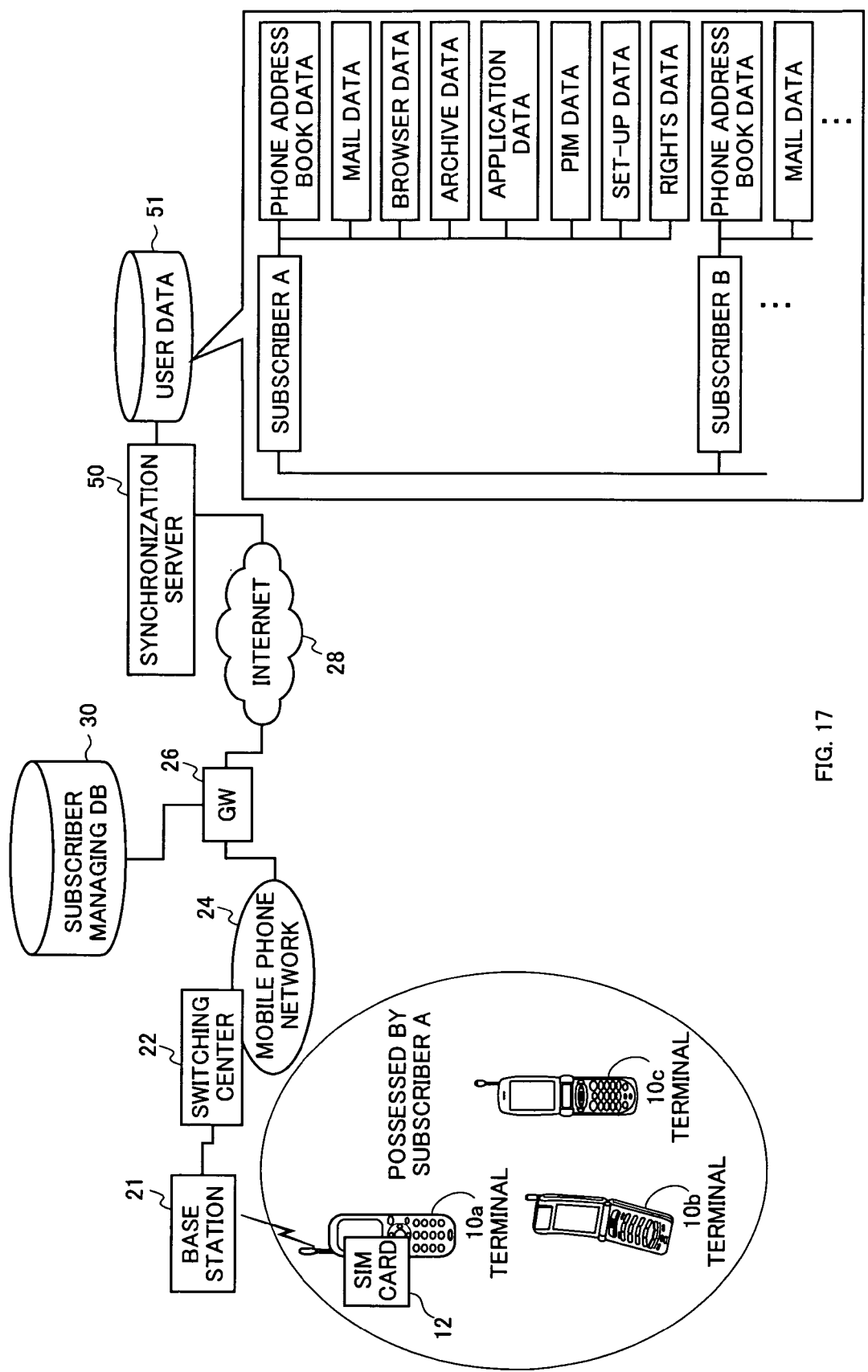
FIG. 17 is a diagram showing another configuration example of the system according to the present invention.

FIG. 17 shows another configuration example of the system according to the present invention. Configuration elements identical to those in the system as shown in FIG. 2 are labeled the same, and tedious explanations will not be made. The subscriber managing database (DB) 30 in the system as shown in FIG. 2 does not necessarily exist at the location of the synchronization server 50, but it may be located at an arbitrary place on the communication network. In the present embodiment, an example is shown, where the subscriber managing database 30 (or 30') is installed at a location different from the synchronization server 50, that is, in the gateway 26 in the figure. The contents of the subscriber managing database may be basically the same as shown in FIGS. 7(*a*) and (*b*).

Figure 18:
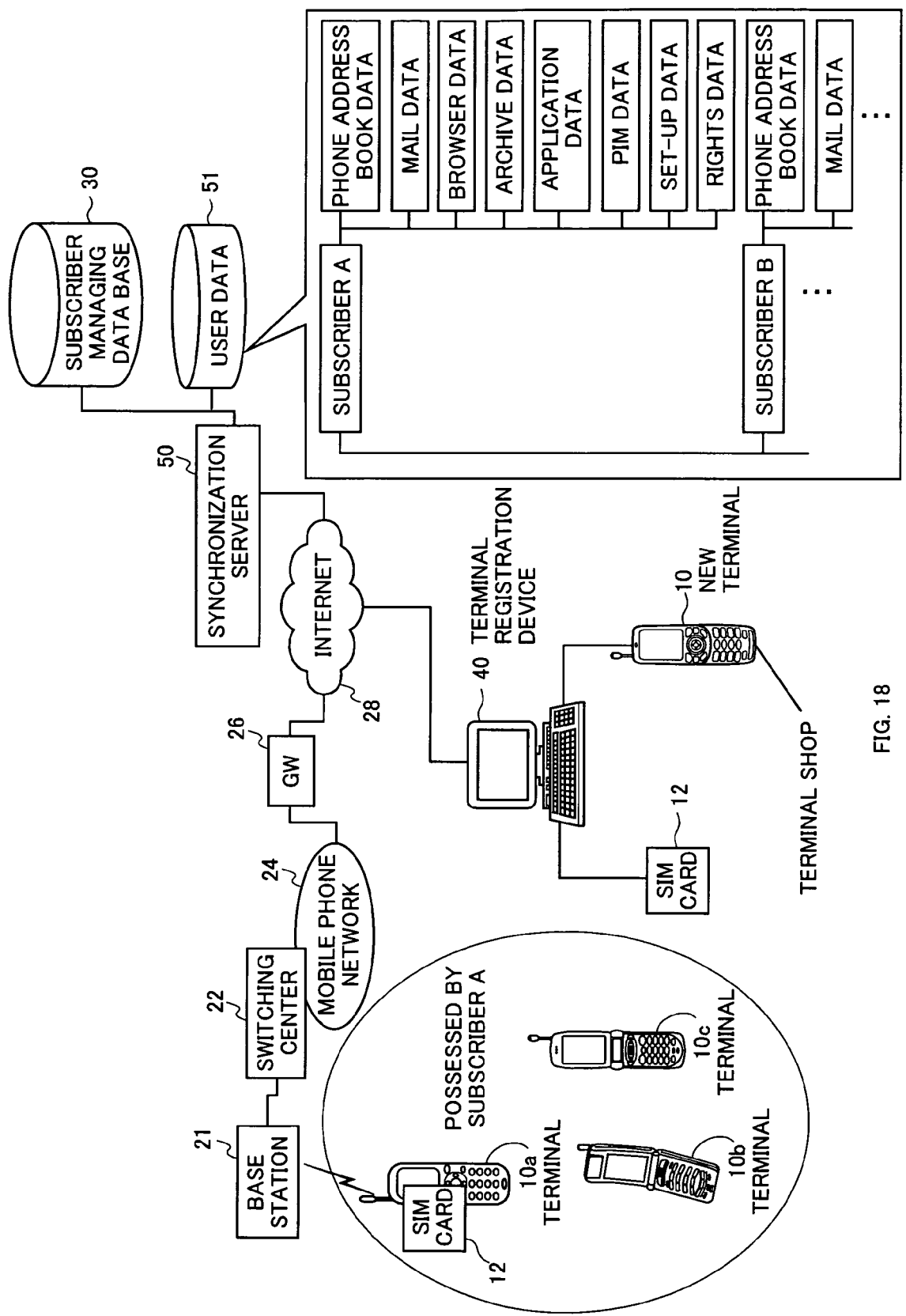
FIG. 18 is a diagram showing further alternative configuration example of the system according to the present invention.

FIG. 18 shows further alternative configuration example of the system according to the present invention. Configuration elements identical to those in the system shown in FIG. 2 are labeled the same, and tedious explanations will not be made. In this system, a shop clerk or a user oneself carries out the initial registration as shown in FIG. 10-A, at a terminal registration device 40 that is installed in the shop, at the point of sale of the terminal, or the like. Specifically, the system above is provided with a terminal ID input means which inputs terminal ID information, being installed at the shop or the like, where a wireless communication terminal is distributed (it is sold, normally), a subscriber identification information input means which inputs the subscriber identification information in the SIM card, and a transmitting means which transmits to the server, the terminal ID information and the subscriber ID information via the communication network. The terminal ID input means incorporates an operating means for manual input, or a reading means by a local connection interface (e.g. IrDA, Bluetooth, wireless LAN, USB cable, or the like) that establishes connection with the wireless communication terminal. The subscriber identification information input means incorporates an operating means which manually inputs the subscriber identification information in the SIM card, or bar code reader, SIM card reader, and the like. The synchronization process after executing the initial registration is the same as shown in the above embodiments.

Figure 19:
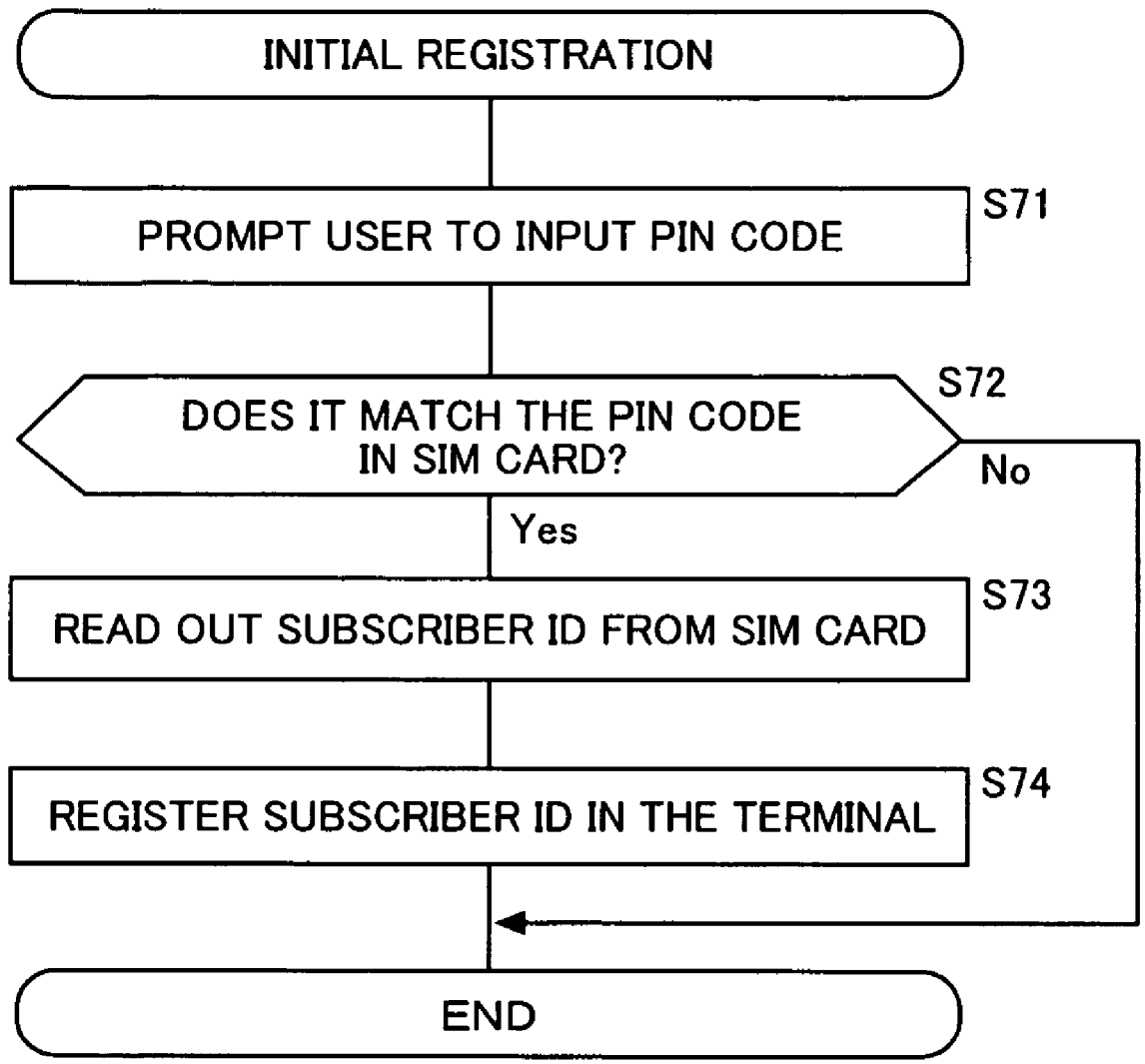
FIG. 19 is a flowchart showing a process flow of the initial registration in the system as shown in FIG. 18, as an alternative of the initial registration as shown in FIG. 10-A.

FIG. 19 shows a process flow of the initial registration in the system as shown in FIG. 18, which substitutes for the initial registration as shown in FIG. 10-A. Steps S71 to S74 in FIG. 19 are respectively associated with steps S21, S22, S25, S26 as shown in FIG. 10-A. A point different from the process shown in FIG. 10-A is that steps S23 and S24 in FIG. 10-A are deleted. This is because, inputting and collating of the terminal password are not necessary, since it is obvious that when the terminal is purchased, the purchaser is an authenticated person who uses the terminal.

Figure 20:
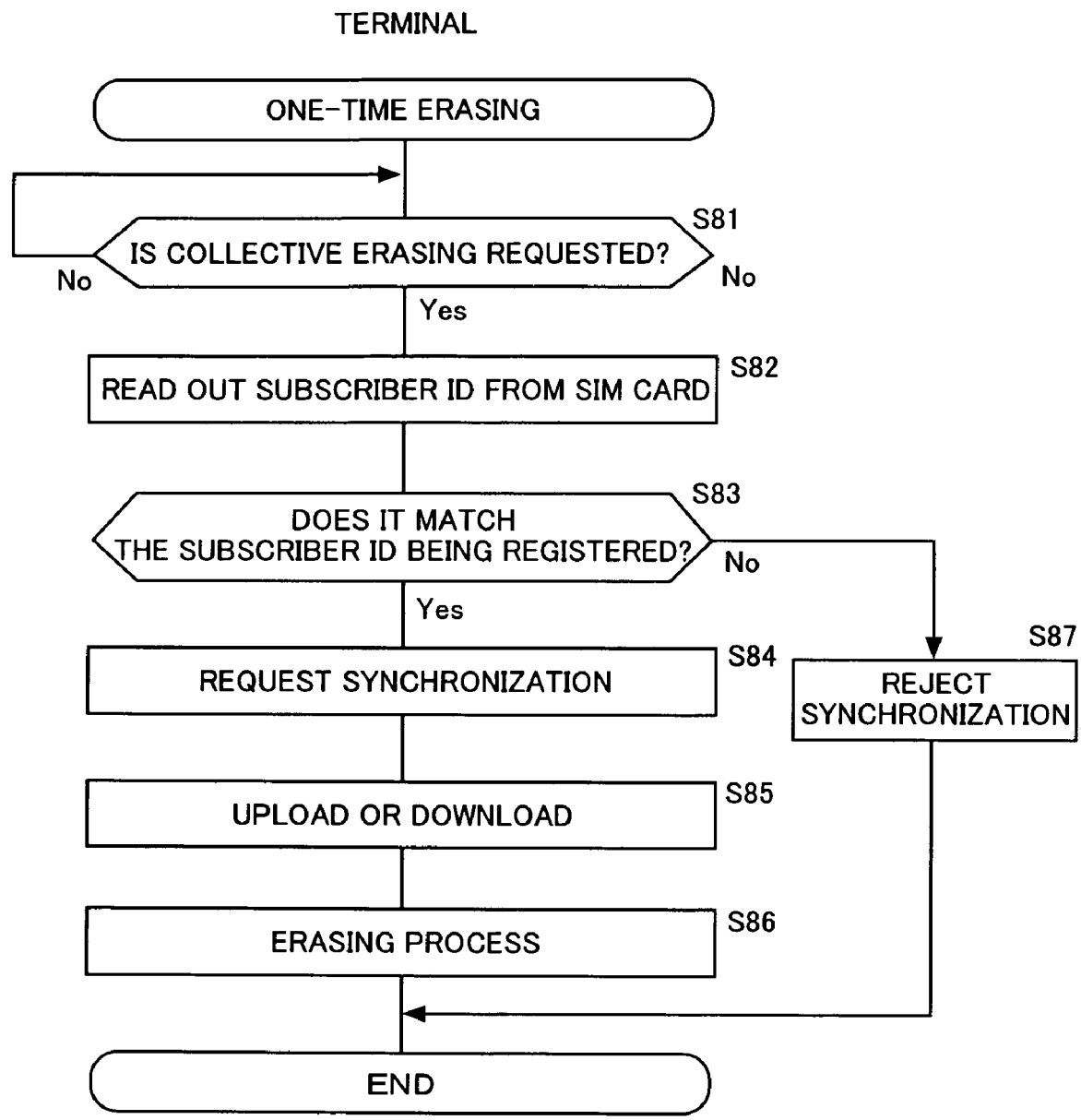
FIG. 20 is a flowchart showing a process flow of collective erasing that is executed by a directive from a user in an embodiment of the present invention.

In the meantime, as described above, a phone number is decided by the SIM card. Therefore, once the SIM card is removed from the terminal, transferring only the terminal to other person is easily performed. In such a case, it is desirable that the personal information in the terminal is erased collectively, so that the terminal is restored to a factory-shipped status. FIG. 20 shows a process flow of this collective erasing that is executed according to a directive from the user.

When collective erasing request is made by the user operation (S81, Yes) to erase the data in the terminal, the following processing is executed. This directive from the user may include a step to select data to be erased.

In response to this collective erasing request, firstly, a subscriber ID is read out from the SIM card that is mounted on the terminal (S82). On the other hand, the subscriber ID registered in the terminal (i.e. subscriber ID information registration area 6*b*) in the initial registration as shown in FIG. 10-A is read out, and it is collated with the above subscriber ID of the SIM card (S83).

If the subscriber ID has not been registered yet, or those subscriber IDs do not mach each other, it means that the SIM card is mounted on an unexpected terminal (i.e. a terminal which is not set for executing the synchronization), and thus the synchronization is rejected (S87).

When those subscriber IDs match each other, it is determined that the terminal is associated with the SIM card (i.e. the terminal is set for synchronization among terminals), and a synchronization request is made to the server (S84). Then, the update data (if it exists) is uploaded to the server (S85). After confirming completion of the uploading, predetermined data in the terminal is subjected to erasing process (S86).

With the procedure above, it is possible to collectively save into the server, the data such as personal information in the terminal, when the user wants to do so. The processing above is performed in a mode where the subscriber ID is registered in the terminal side, without prompting the user to enter the terminal password or the like each time the synchronization is executed. On the other hand, the above collective erasing process may also be similarly applied to a mode where the terminal ID is registered in the SIM card as shown in FIG. 11-B, or in a mode where the user is prompted to enter the terminal password or the like each time the synchronization is executed as shown in FIG. 12.

In the meantime, there is a possibility that a process for executing synchronization according to a preset timing or user's operation overlaps execution of any other process on the terminal. In such a case, when the synchronization process is executed in parallel with the other process in the terminal, there may be various negative effects, because data as a target of the synchronization may need a communication time appropriate for the volume thereof, or it may influence the other process.

On the other hand, if it is not assumed that the synchronization process is executed in parallel with the other process, this indicates that the other process cannot be executed until the synchronization process is completed. Therefore, it may be inconvenient for the user when he or she wants to use the other process. For example, when the user mounts the SIM card on a certain terminal and immediately thereafter the synchronization process is executed automatically, there is a possibility that an operation that the user wants to perform cannot be executed.

Figure 21:
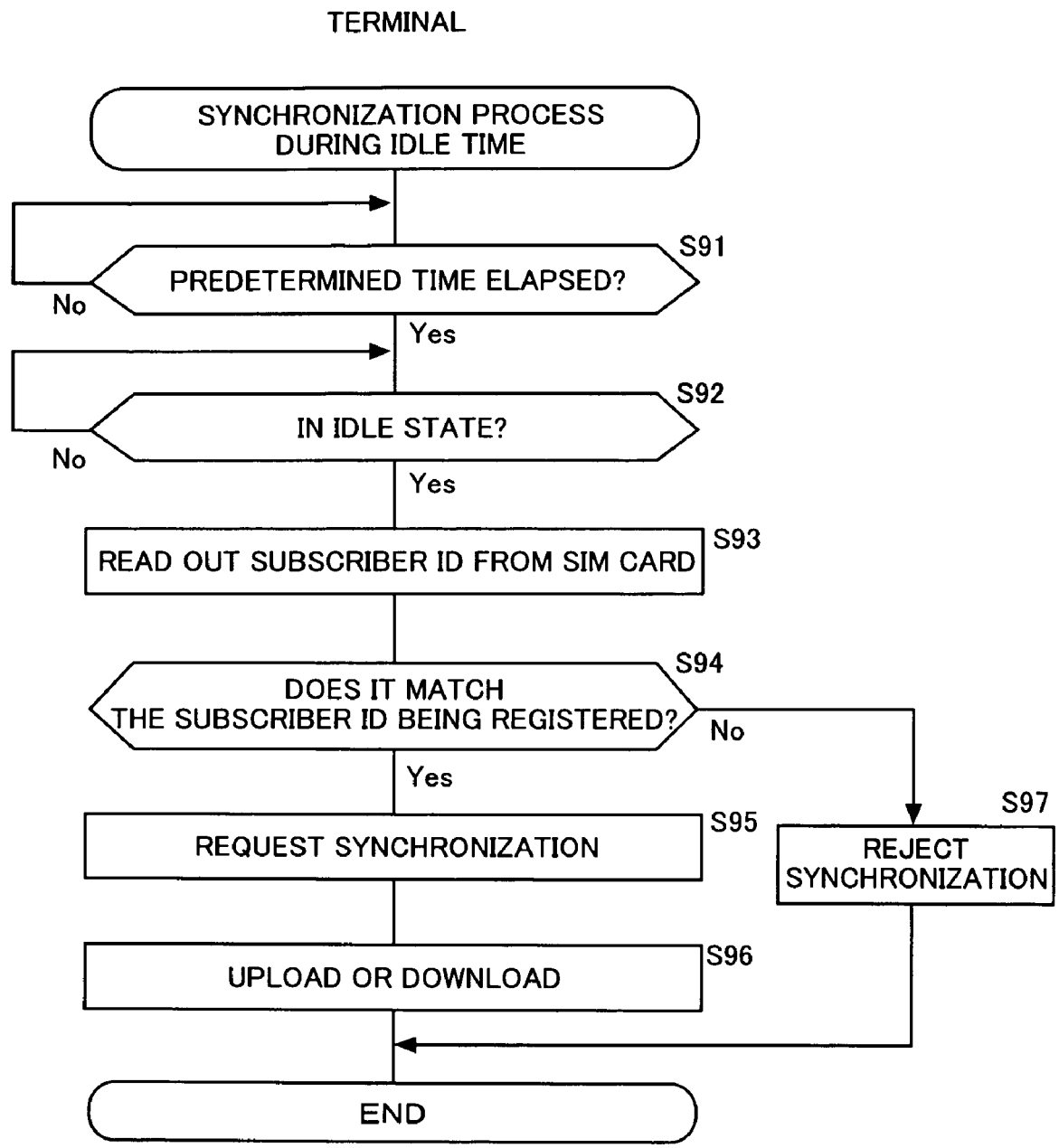
FIG. 21 is a flowchart showing the synchronization process that is executed while a predetermined process is not performed (during idle time) on the terminal device in an embodiment of the present invention.

In view of the situation above, a configuration is conceivable in which the terminal confirms that the terminal is in idle state, and then starts the synchronization process. FIG. 21 shows a synchronization process when the terminal is in idle state as described above. It is to be noted that the idle state maybe referred to as "waiting state" or "standby state" depending on a skilled person. If this term is explained taking a mobile phone terminal as an example, it may indicate a status waiting for an incoming call, incoming mail, or the like (so-called waiting screen may also be displayed), or a status waiting a trigger for activating various applications provided in the terminal, such as mailer, browser, phone directory, or the like.

It is determined whether or not the terminal is in idle state, depending on whether or not arbitrary set conditions are satisfied. Such conditions may include the following:
(1) a condition being in state where a predetermined process is not executed (for example, storing process, input process, display process, or communication process, with execution of various applications of the terminal);
(2) a condition in which there is no operation by the user, or a predetermined period of time has elapsed from the last operation; and
(3) a condition in which the state of the terminal body has been changed (for example, if the terminal has a flip body, it is in a state being folded).

In the present example, this process is started periodically with an interval of predetermined period of time. Firstly, it is determined whether or not the predetermined period of time has elapsed since the previous execution of this process (S91). If it is determined that the predetermined period of time has elapsed, it is further determined whether or not the terminal is in idle state (S92). It is conceivable there is a case where only the determination of idle state is carried out and the decision in step S91 is not made.

If it is determined as being in idle state, a subscriber ID is read out from the SIM card that is mounted on the terminal (S93). On the other hand, the subscriber ID is read out, which is registered in the terminal (i.e. the subscriber ID information registration area 6b) at the initial registration as shown in FIG. 10-A (S93). Then, the subscriber ID thus read out is collated with the subscriber ID of the SIM card (S94).

If the subscriber ID has not been registered yet in the terminal, or those subscriber IDs do not match each other, the synchronization is rejected (S97).

If the subscriber ID thus read out match the subscriber ID of the SIM card, a request of synchronization is made to the server (S95). Then, uploading or downloading of the update data is performed with the server (S96). In addition, it is possible to set the upper limit to the data transfer for one time, such as transfer data amount and transfer time. This upper limit may be provided independently for uploading and downloading, or it may be provided for the total sum of uploading and downloading.

With the processing above, it is possible to reduce the time period for one-time communication when the synchronization is executed, and prevent that the synchronization process unnecessarily restricts opportunities for the users to use the terminal.

If it is determined that the terminal is not in idle state and the synchronization process is not executed (S92, No), the process may be tried again after a lapse of predetermined period. Alternatively, another means is provided to detect that the terminal becomes in idle state, and the synchronization process may be executed according to the notification from the detecting means.

Figure 22:
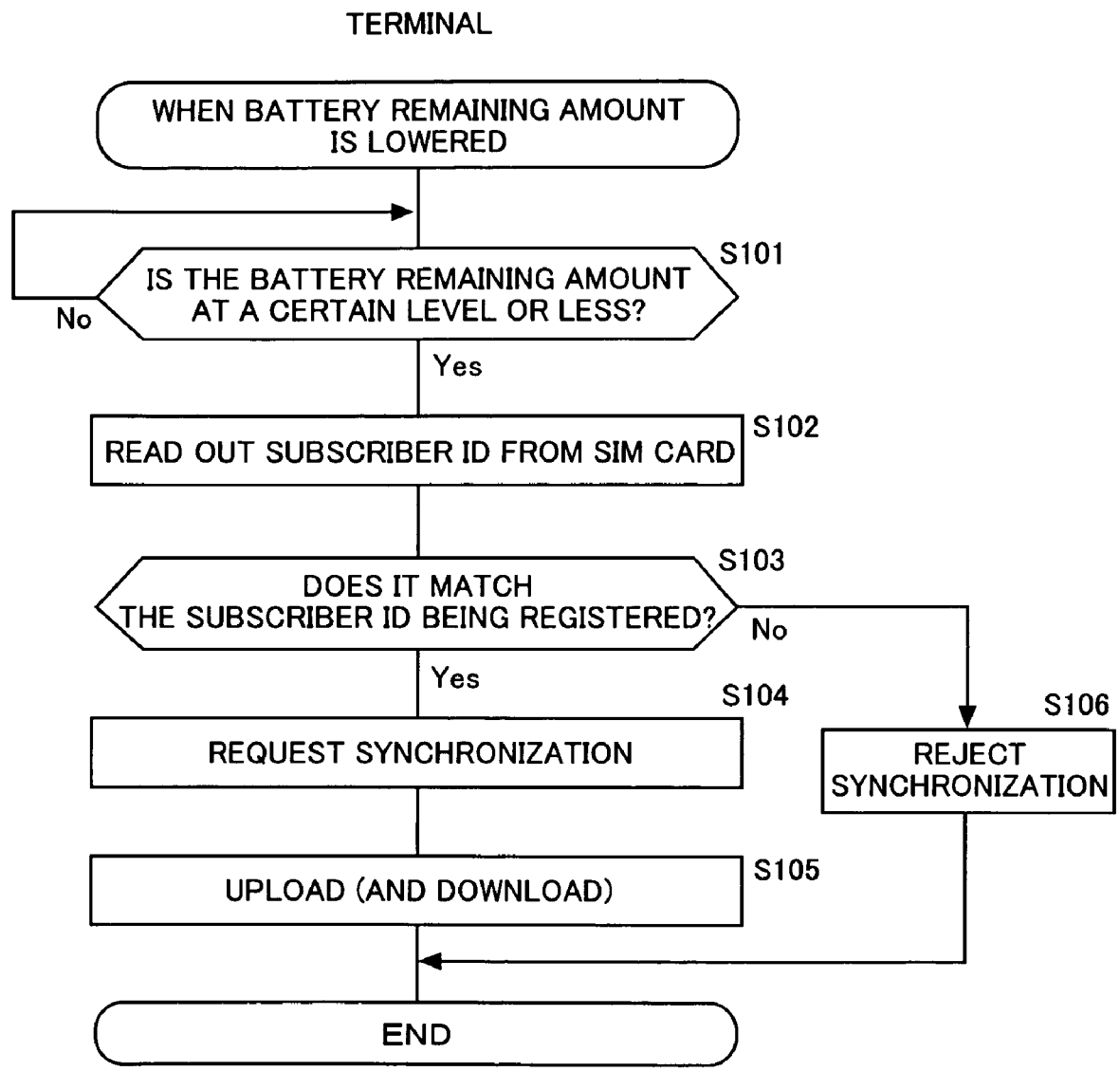
FIG. 22 is a flowchart showing a process that is automatically executed at the time of lowering of battery remaining amount in an embodiment of the present invention.

Since it is now possible to change terminals freely by selectively mounting and demounting the SIM card on and from each terminal, there may be considered an example in which a user possesses plural terminals to utilize them selectively. Lowering of battery remaining amount is considered to be one factor for such selective utilization. Since the terminal is activated by the battery, it becomes inoperable if the battery remaining amount is lowered to equal to or less than a necessary level. In view of this situation, there may be a case where the user shifts the SIM card from the first terminal with the lowered battery remaining amount, to the second terminal with a sufficient battery amount, whereby migration is performed from the first to the second terminal. In such a case above, it is desirable that the update data in the first terminal is immediately reflected to the second terminal. FIG. 22 shows a processing that is automatically executed at the time when the battery remaining amount is lowered.

When the battery remaining amount detected by the battery remaining amount detecting section 15 (FIG. 3) becomes at a predetermined level or less (S101, Yes), the processing shifts to the next step. Firstly, a subscriber ID is read from the SIM card that is mounted on the terminal (S102). Next, the subscriber ID registered in the terminal is read out, and the subscriber ID thus read out is collated with the subscriber ID of the SIM card (S103). If the subscriber ID has not been registered yet in the terminal, or those subscriber IDs do not match each other, the synchronization is rejected (S106).

If those subscriber IDs match each other, a request for synchronization is made to the server (S104). Then, uploading (and downloading) of the update data is performed with the server (S105). It is to be noted that the downloading at this point of time is not necessarily required, and downloading may be omitted, since it is preferable that processing load is reduced when the battery remaining amount is lowered. This downloading can be executed at the time when the SIM card is mounted, after the battery remaining amount is resumed.

It is preferable that the user is notified of the processing above prior to its execution, or the processing is executed with permission from the user. Alternatively, it is preferable that the user is notified of the processing above, after the execution thereof. With the processing, it is no more necessary for the user to consciously start the synchronization process manually.

Preferred embodiments of the present invention have been explained so far, but other than the above examples, various modifications and changes are available.

For instance, in the above embodiments, the present invention has been explained, taking a synchronization service mode that is targeting plural users. However, there may be another way of example that executes synchronization among one's plural terminals, where the user utilizes a server or a storage area therein, being for personal use.

When update data that has not been reflected exists on the server side, upon executing the synchronization process, this substantial data is downloaded. Alternatively, another configuration may be considered; only identification information (for example, information such as title or index of the update data) for accessing the substantial data is transmitted, not the substantial data itself, and when there is a request from the terminal, the substantial data is transmitted.

Character information such as PIN code and password has been used, but it is not limited to this example. It is further possible to employ arbitrary authentication information, which utilizes a fingerprint, an iris, a voiceprint, vein pattern or the like.

There has been explained an example that the number of terminals possessed by the user is three. However, this number of units may be two, or four or more.

INDUSTRIAL APPLICABILITY

The present invention is applicable to a design, development, and manufacturing of a wireless communication system and a wireless communication terminal and a server incorporated in this wireless communication system.

What is claimed is:

1. A wireless communication terminal synchronization method in which data stored in a memory in each of plural wireless communication terminals is synchronized with each other, when a user selectively utilizes the plural wireless communication terminals by using a single subscriber information card, at least communicating operation in each of the wireless communication terminals being enabled by mounting thereon the subscriber information card that records subscriber information, the method comprising the steps of:

uploading from a first wireless communication terminal with the subscriber information card being mounted, to a server via a communication network, updated part of data which is stored in a memory in the first wireless communication terminal, in accordance with a user's request or automatically, said uploading being performed with only data updated after the subscriber information card was mounted on the first wireless communication terminal, while leaving the uploaded data in the memory in the first wireless communication terminal even when the subscriber information card is dismounted from the first wireless communication terminal, wherein said uploading is allowed to be executed at least under conditions that the user is confirmed to be an authenticated user of said subscriber information card and an authenticated user of the first wireless communication terminal;

updating contents in a user's data storage area with the data being uploaded, in the server;

downloading the data to a second wireless communication terminal via the communication network from the server, the data being confirmed in accordance with a user's request or automatically, as data to be downloaded to the second wireless communication terminal from the server, after the subscriber information card having been demounted is mounted on the second wireless communication terminal, said downloading being performed with only data which is present in the storage area of the server and which is not present in the memory of the second wireless communication terminal, wherein said downloading is allowed to be executed at least under conditions that the user is confirmed to be an authenticated user of said subscriber information card and an authenticated user of the second wireless communication terminal; and updating the contents of the memory in the second wireless communication terminal, said uploading being performed with only data updated after the subscriber information card was mounted on the second wireless communication terminal, while leaving the uploaded data in the memory in the second wireless communication terminal, wherein said uploading is allowed to be executed at least under conditions that the user is confirmed to be an authenticated user of said subscriber information card and an authenticated user of the second wireless communication terminal.

2. The wireless communication terminal synchronization method according to claim 1, wherein, said uploading is allowed to be executed at least under conditions that the wireless communication terminal that requested the uploading is confirmed to be a terminal being associated with said subscriber information card in advance.

3. The wireless communication terminal synchronization method according to claim 1 or 2, wherein, the conditions are confirmed on the terminal side.

4. The wireless communication terminal synchronization method according to claim 1 or 2, wherein, the conditions are confirmed on the server side.

5. The wireless communication terminal synchronization method according to claim 1 or 2, wherein, a data attribute as a target of said uploading and said downloading is registered in advance, and in each of the terminals, only the data having the data attribute registered in each own terminal becomes the target of the uploading and the downloading.

6. A wireless communication system comprising plural wireless communication terminals at least communication operation of which is enabled by mounting a subscriber information card recording subscriber information, and a server that is connected with the wireless communication terminals via a communication network, said server comprising:

a communication interface which performs data communication with said wireless communication terminals via the communication network;

a storage unit which includes a storage area to store a copy of the data stored in said plural wireless communication terminals; and a server side synchronization engine which synchronizes the data of a user stored in the wireless communication terminals and the data stored in the storage unit according to a request from any one of said wireless communication terminals;

each of the wireless communication terminals comprising:

a card reader which detachably mounts a subscriber information card;

a wireless communication interface which is operable when said subscriber information card is mounted;

a memory which stores user data; and a terminal side synchronization engine which requests execution of synchronization to said server after said subscriber information card is mounted, uploading or downloading of data being executed with said server as required, said uploading being performed with only data updated after the subscriber information card was mounted on the wireless communication terminal, leaving the uploaded data in the memory even when the subscriber information card is dismounted from the wireless communication terminal, and said downloading being performed with only data which is present in the storage unit of the server and which is not present in the memory of the wireless communication terminal; and at least either one of said server and each of said wireless communication terminals further comprising:

an authentication engine which allows only plural wireless communication terminals possessed by an identical user, to perform synchronization as to the user data of the user in the storage unit of said server;

said authentication engine being adapted to allow synchronization to be executed at least under conditions that the user who requested the synchronization is confirmed to be an authenticated user of said subscriber information card and an authenticated user of the terminal.

7. The wireless communication system according to claim 6, wherein, said authentication engine confirms that the user of the terminal that requested the synchronization is an authenticated user of said subscriber information card, on the basis of personal identification information being associated with said subscriber information card.

8. The wireless communication system according to claim 6, wherein, said authentication engine confirms that the user is an authenticated user of the terminal on the basis of personal identification information being associated with the wireless communication terminal.

9. The wireless communication system according to claim 6, wherein, said authentication engine allows executing the synchronization under conditions that the terminal that requested the synchronization is confirmed to be the terminal that is associated with the subscriber information card in advance.

10. The wireless communication system according to claim 9, wherein, said authentication engine is provided in the terminal so as to store in a memory of the terminal, the subscriber identification information recorded in said subscriber information card, and in performing authentication, it is checked whether the subscriber identification information of the subscriber information card mounted on the wireless communication terminal and the subscriber identification information stored in the memory of the terminal as a target for authentication match with each other, thereby confirming that the terminal requested the synchronization is a terminal being associated with said subscriber information card in advance.

11. The wireless communication system according to claim 9, wherein, said authentication engine is provided in the terminal so as to store in the memory of the subscriber information card mounted on the terminal, the terminal identification information recorded in the terminal, and in performing authentication, it is checked whether any of the plural terminal identification information stored in the memory of the subscriber information card and the terminal identification information recorded in the terminal as a target of the authentication match with each other, thereby confirming that the terminal requested the synchronization is a terminal being associated with the subscriber information card in advance.

12. The wireless communication system according to claim 11, wherein, said server comprises:
a subscriber managing database to register the subscriber identification information of the subscriber information card and terminal identification information of plural wireless communication terminals of the user in such a manner as being associated with each other; said authentication engine is provided in said server to receive from the wireless communication terminal, subscriber identification information recorded in the subscriber information card and terminal identification information of the wireless communication terminal on which the subscriber information card is mounted, and confirms that the terminal identification information thus received is registered in the subscriber managing database, in such a manner as being associated with the subscriber identification information thus received, thereby confirming that the terminal that requested the synchronization is a terminal being associated with said subscriber information card in advance.

13. A wireless communication terminal at least communication operation of which is enabled by mounting a subscriber information card that records subscriber information, said terminal comprising:
a card reader which detachably mounts a subscriber information card;
a wireless communication interface which is operable when the subscriber information card is mounted;
a memory which stores user data; and
a terminal side synchronization engine which requests execution of synchronization to the server on the communication network after the subscriber information card is mounted, and executes uploading or downloading of data with the server as required, said uploading being performed with only data updated after the subscriber information card was mounted on the terminal, leaving the uploaded data in the memory even when the subscriber information card is dismounted from the terminal, and said downloading being performed with only data which is present in a storage unit of a server and which is not present in the memory of the terminal, and wherein said synchronization engine allows the synchronization to be executed at least under conditions that the user of the terminal who requested the synchronization is confirmed to be an authenticated user of said subscriber information card and an authenticated user of the terminal.

14. The wireless communication terminal according to claim 13, wherein, said authentication engine allows only plural wireless communication terminals possessed by an identical user to perform synchronization for the user data of the user in a storage unit in said server.

15. The wireless communication terminal according to claim 13, wherein, said authentication engine confirms that the user of the terminal that requested the synchronization is an authenticated user of said subscriber information card, on the basis of personal identification information being associated with said subscriber information card.

16. The wireless communication terminal according to claim 13, wherein, said authentication engine confirms that the user is an authenticated user of the terminal on the basis of personal identification information that is associated with the wireless communication terminal.

17. The wireless communication terminal according to claim 13, wherein, said authentication engine allows executing the synchronization under conditions that the terminal that requested the synchronization is confirmed to be the terminal that is associated with said subscriber information card in advance.

18. The wireless communication terminal according to claim 17, wherein, said authentication stores in the memory of the terminal, the subscriber identification information recorded in said subscriber information card, and in performing authentication, it is checked whether the subscriber identification information of the subscriber information card mounted on the terminal and the subscriber identification information stored in the memory of the terminal as a target for authentication match with each other, thereby confirming that the terminal requested the synchronization is a terminal being associated with said subscriber information card in advance.

19. The wireless communication terminal according to claim 17, wherein, said authentication engine stores the terminal identification information recorded in the terminal in the memory in the subscriber information card mounted on the terminal, and in performing authentication, it is checked whether any of the plural terminal identification information stored in the memory in the subscriber information card and the terminal identification information recorded in the terminal as a target of the authentication match with each other, thereby confirming that the terminal requested the synchronization is a terminal being associated with the subscriber information card in advance.

20. The wireless communication terminal according to claim 13, further comprising:
a card detector which detects mounting and/or demounting of said subscriber information card, wherein, said terminal side synchronization engine accesses said server triggered by detecting the mounting and/or demounting of said subscriber information card, and requests execution of the synchronization.

21. The wireless communication terminal according to claim 13, comprising a battery remaining amount detecting section that detects a battery remaining amount, wherein, said terminal side synchronization engine accesses said server triggered when the battery remaining amount becomes a predetermined level or less, and requests execution of synchronization including at least data uploading.

22. The wireless communication terminal according to claim 13, wherein, said terminal side synchronization engine is provided with a judging engine which judges whether or not the terminal is in idle state, and executes the synchronization process when said judging engine determines that the terminal is in idle state.

23. The wireless communication terminal according to claim 13, wherein, said terminal side synchronization engine accesses said server in response to a directive from a user and uploads data as a target for uploading, and then, erases a predetermined data in the terminal all at once.

24. A server being connected via a communication network with plural wireless communication terminals at least communication operation of which is enabled by mounting thereon a subscriber information card that records subscriber information, said server comprising:
a communication interface which performs data communication with said wireless communication terminals via the communication network;
a storage unit which has a storage area to store a copy of the data that is stored in said plural wireless communication terminals;
a server side synchronization engine which performs synchronization with said wireless communication terminals for user data stored in said storage unit, in accordance with a request from said wireless communication terminals, said synchronization being performed with only data updated after the subscriber information card was mounted on one of the wireless communication terminals, while leaving uploaded data stored in the wireless communication terminal even when the subscriber information card is dismounted from the wireless communication terminal; and
an authentication engine which allows only plural wireless communication terminals possessed by an identical user to perform synchronization for the user data of the user in the storage unit, wherein said authentication engine allow synchronization to be executed at least under conditions that the user is confirmed to be an authenticated user of said subscriber information card and an authenticated user of the wireless communication terminal on which said subscriber information card is mounted.

25. The server according to claim 24, wherein, said authentication engine confirms that the user of the terminal that requested the synchronization is an authenticated user of said subscriber information card, on the basis of personal identification information being associated with said subscriber information card.

26. The server according to claim 24, wherein, said authentication engine confirms that the user is an authenticated user of the terminal on the basis of personal identification information that is associated with the wireless communication terminal.

27. The server according to claim 24, wherein, said authentication engine allows executing the synchronization under conditions that the terminal requested the synchronization is confirmed to be the terminal that is associated with said subscriber information card in advance.

28. The server according to claim 27, further comprising:
a subscriber managing database to register the subscriber identification information of the subscriber information card and terminal identification information of plural wireless communication terminals of the user in such a manner as being associated with each other; said authentication engine receiving from the wireless communication terminal, subscriber identification information recorded in said subscriber information card and terminal identification information of the wireless communication terminal on which the subscriber information card is mounted, and confirming that the terminal identification information thus received is registered in the subscriber managing database, in such a manner as being associated with the subscriber identification information thus received, thereby confirming that the terminal that requested the synchronization is a terminal that is associated with said subscriber information card in advance.

* * * * *